US007007208B1

(12) United States Patent
Hibbert et al.

(10) Patent No.: US 7,007,208 B1
(45) Date of Patent: Feb. 28, 2006

(54) SYSTEMS AND METHODS FOR DATA UNIT MODIFICATION

(75) Inventors: Geoffrey Hibbert, San Jose, CA (US); Chris Cicchetti, Menlo Park, CA (US); Henry Poelstra, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 410 days.

(21) Appl. No.: 10/448,917

(22) Filed: May 30, 2003

Related U.S. Application Data

(60) Provisional application No. 60/384,456, filed on May 31, 2002, provisional application No. 60/419,421, filed on Oct. 18, 2002.

(51) Int. Cl.
*G01R 31/28* (2006.01)

(52) U.S. Cl. .................. 714/712; 709/231; 341/51

(58) Field of Classification Search ................ 380/209; 345/531; 709/230, 231; 370/392; 712/228; 714/712; 341/51
See application file for complete search history.

(56) References Cited

U.S. PATENT DOCUMENTS

| 5,278,908 | A | * | 1/1994 | Parikh et al. ............... 380/209 |
| 5,361,301 | A | * | 11/1994 | Robertson et al. .......... 380/209 |
| 5,367,632 | A | * | 11/1994 | Bowen et al. ............... 345/531 |
| 5,463,689 | A | * | 10/1995 | Schutte et al. .............. 380/209 |
| 6,268,808 | B1 | | 7/2001 | Iryami et al. ................. 341/51 |
| 6,651,102 | B1 | * | 11/2003 | Baker et al. ................. 709/230 |
| 6,778,534 | B1 | * | 8/2004 | Tal et al. ..................... 370/392 |
| 6,880,070 | B1 | * | 4/2005 | Gentieu et al. ............. 712/228 |

* cited by examiner

*Primary Examiner*—David Ton
(74) *Attorney, Agent, or Firm*—Workman Nydegger

(57) ABSTRACT

A modification subsystem suitable for introducing user-defined errors into a designated data unit substantially in real time, so as to facilitate evaluation of the response of a high speed data communications system to errors as such are exemplified in the modified data unit. The modification subsystem includes a modification logic and state machine that communicates with a command stack memory and one or more jamming mode registers. Upon locating and identifying the designated data unit in a data stream, the modification logic and state machine accesses a jam setting stored in a jam mode register and, if it is determined that the modification that corresponds to the jam setting is valid, modifies the designated data unit in accordance with the jam setting. If the proposed modification is invalid, the modification is aborted.

36 Claims, 11 Drawing Sheets

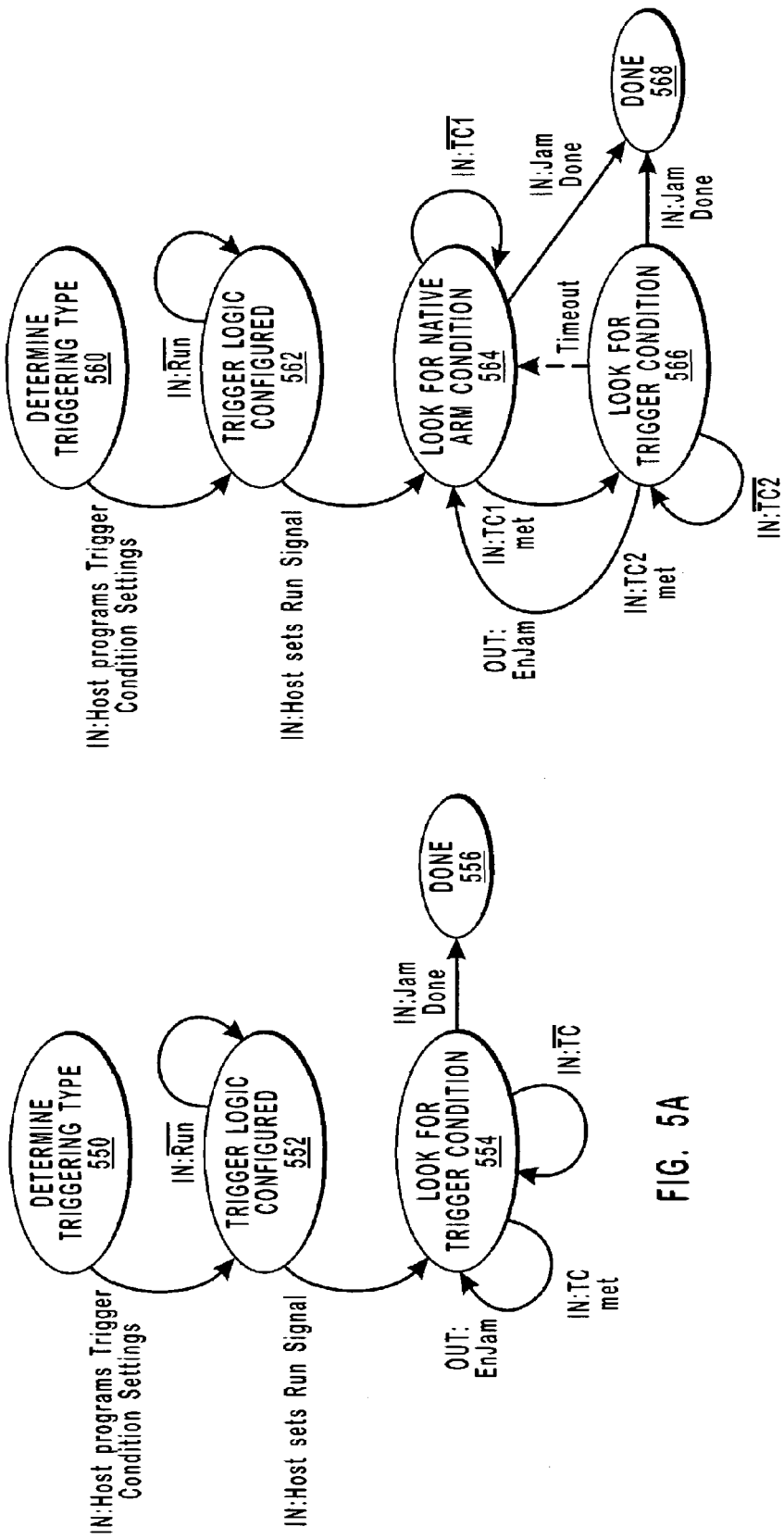

SYSTEMS AND METHODS FOR DATA UNIT MODIFICATION

CROSS-REFERENCE TO RELATED APPLICATIONS

This application hereby claims priority to U.S. Provisional Patent Application Ser. Nos. 60/384,456, entitled SYSTEMS AND METHODS FOR MODIFYING NETWORK DATA, filed May 31, 2002, and 60/419,421, entitled SYSTEMS AND METHODS FOR DATA PACKET MODIFICATION, filed Oct. 18, 2002, both of which are made a part hereof and incorporated herein in their respective entireties by this reference.

BACKGROUND OF THE INVENTION

1. Field of the Invention

The present invention relates generally to high speed data communications systems. More particularly, embodiments of the present invention relate to systems and methods for introducing user-defined errors in a designated data unit substantially in real time, so as to facilitate evaluation of the response of the high speed data communications system to errors such as are exemplified in the modified data unit.

2. Related Technology

Computer and data communications networks continue to proliferate due to declining costs, increasing performance of computer and networking equipment, and increasing demand for communication bandwidth. Communications networks— including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include GigE ("GigE"), Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network.

Notwithstanding such distinctions, many of the network types share certain similar characteristics. For the most part, the "traffic stream," sometimes also referred to as "network traffic" or a "data stream," that is transmitted over a network medium includes several classes of digital data units or data packets, each of which has a predefined format. One type of data unit is referred to as an "Ordered Set." An Ordered Set is a set of bits, normally ranging from 8 to 32 bits, in multiples of 8, that are used for various purposes. For example, within the Fibre Channel protocol, there are several types, including, OPN, CLS, RRDY and IDLE.

Another type of data unit is referred to as a "frame" (also referred to as "data frames" or "data packets"), which can be of fixed or variable length. Typically, data frames have headers and footers on the two ends of the frame, and a data portion, or data payload, disposed between the header and footer. Other information may also be included in the frame, such as information for error checking functions for example.

Typically, the specific layout or configuration of such a data frame is specified by the "physical layer protocol" of the network involved. For example, depending on the frame format, a frame can begin with a "Start of Frame" delimiter (SOF), which is followed by a header, then a frame data payload, then a Cyclical Redundancy Check (CRC), and then ending with an "End of Frame" delimiter (EOF). There are several types of SOFs and EOFs, any one of which may be included in a frame. A frame header can be the combination of a channel header, followed by other optional high level headers, and other, optional, application specific headers.

The frame header and data payload, as well as other components of the frame, include one or more bundles of data, also referred to as "words." According to High (Speed Data Channel conventions, a word includes 32 bits, which is equivalent to 40 bits of serial data transfer on the network medium. The minimum size of a data packet component, such as a frame header or data payload, may vary depending upon the protocol or other requirements of the network over which the data packet is transmitted. Within the Fibre Channel protocol for example, the minimum size for such data packet components is 32 bits, or one word. As another example, the minimum size for data packet components within the GigE protocol is 8 bits.

Typically, transmissions between two network connected devices, for example, are passed through a hierarchy of protocol layers at each of the connected devices. Each layer in the first network connected device essentially carries on a conversation with a corresponding layer in the second network connected device, in accordance with an established protocol that defines the rules of communication between the layers.

For example, one well-known protocol standard is the Open Systems Interconnection (OSI) Model. OSI defines a seven-layer protocol model, which is widely used to describe and define how various vendors' products communicate. In the OSI model, the highest network layer is the Application Layer. The Application Layer is the level through which user applications, such as word processing programs or email programs for example, access network services. The next layer is the Presentation Layer which translates data from the Application Layer into an intermediate format and provides data encryption and compression services. The next layer is referred to as the Session Layer, which allows two applications on different network connected devices to communicate by establishing a dialog control between the two devices that regulates which side transmits, when each side transmits, and for how long. The next layer, the Transport Layer, is responsible for error recognition and recovery, repackaging of long messages into small packages of information, and providing an acknowledgement of receipt. The next layer is the Network Layer, which addresses messages, determines the route along the network from the source to the destination computer, and manages traffic problems, such as the switching and routing of data transmissions, as well as managing congestion that may occur as a result of such data transmissions.

It is the next layer, referred to as the Data Link Layer, which packages raw bits into the logical structured packages such as data packets or data frames, referred to above. The Data Link Layer corresponds, for example, to the GigE physical layer protocol noted above. This layer then sends the data frame or other data packet from one network connected device to another. The lowest layer in the hierarchal model is the Physical Layer, which is responsible for transmitting bits from one network connected device to another by regulating the transmission of a stream of bits over a physical medium such as a cable, optical fiber, or other type of conductor. The Physical Layer defines how the cable is attached to the network interface card within the network connected device and what transmission techniques are used to send data over the cable.

Thus, as a message comprising one or more data packets is passed down through each of these respective layers at the transmitting network-connected device, for example, and then back up through the protocol layers of the receiving network-connected device, each layer of the protocol(s) may add or strip off, as applicable, protocol information to/from the message. Thus, the "data" present within the data payload of the data frame at the Data Link Layer (e.g., the GigE data frame) typically comprises a protocol stack comprised of multiple message packets. Each message packet has its own protocol format, and it may in turn be embedded within the data payload of another higher layer message, also having its own different protocol.

As communication networks have increased in number, size and complexity however, they have become more likely to develop a variety of problems that are increasingly difficult to diagnose and resolve. Moreover, the demands for network operational reliability and increased network capacity, for example, emphasize the need for adequate diagnostic and remedial systems, methods and devices.

Exemplary causes of network performance problems include the transmission of unnecessarily small frames of information, inefficient or incorrect routing of information, improper network configuration and superfluous network traffic, to name just a few. Such problems are aggravated by the fact that many networks are continually changing and evolving due to growth, reconfiguration and introduction of new network typologies and protocols, as well as the use of new interconnection devices and software applications.

Consequently, as high speed data communications mature, many designs increasingly focus on reliability and performance issues. In particular, communications systems have been designed to respond to a variety of network errors and problems, thereby minimizing the occurrence of network failures and downtimes. In addition, equipment, systems and methods have been developed that allow for the testing and monitoring of the ability of a communications system to respond to and deal with specific types of error conditions on a network. In general, such equipment, systems, and methods provide the ability to selectively alter channel data, including the introduction of errors into channel data paths.

Thus, the use of such equipment permits monitoring of the response of the communications system to the altered data, and helps determine whether the communications system is capable of responding without experiencing adverse effects in performance such as loss of data or network traffic interruption. For example, a network system designer can perform any one of a number of different diagnostic tests to make determinations such as whether a system responded appropriately to incomplete, misplaced or missing tasks or sequences, how misdirected or confusing frames are treated, and how misplaced ordered sets are treated.

However, such diagnostic equipment, systems, and methods have not proven capable of dealing with the myriad of different and evolving protocol and network types. For example, to insure a realistic test environment, the equipment must be capable of injecting realistic errors in a manner that does not adversely affect the data transmission, or 'line,' rate of the network. In particular, such equipment should be capable of introducing errors into the network in substantially real time, so as to provide a realistic stress on the network. This has proven increasingly difficult given the present trend in communication network data transmission rates. Moreover, the introduction of errors into a network data stream must be accomplished in a predictable manner in order to yield useful results. This is especially difficult to accomplish with certain types of protocols, such as Gigabit Ethernet.

As noted above, the introduction of certain user-defined errors into a data stream is a useful method for performing various diagnostic and troubleshooting evolutions. In particular, because specific data packets can be tracked as they move through the high speed communications system, a user can readily track the data packet containing the error, and then observe the response of the system to the particular error contained in that package. Once the response of the system is known, the user can then modify the system as/if required to obtain a different response. By way of example, the system may be modified so that it will perform certain actions upon recognizing a data packet containing a particular error.

User-defined errors such as those described above may be introduced into the data packet in various ways and/or may take any of a variety of different forms. One technique that is employed in this regard is sometimes referred to as 'truncation.' Generally, truncation refers to a process wherein some aspect of the data packet is reduced in size, or truncated, so that while the data packet remains otherwise valid or 'legal,' it will be recognized, such as at a receiving device, as being somewhat shorter than the data packet that originated at the sending device. In many cases, this sort of evaluation performed at the receiving device takes the form of a cyclical redundancy check (CRC) or other error check process.

A number of factors guide the truncation process. One such factor relates to the 'validity' of the particular data packet that is to be modified. In particular, diagnostic processes such as those noted herein, rely for their effectiveness on the ability of the devices in the high speed communications system to recognize and process the data packet, even though it has been modified. An invalid or unrecognizable data packet cannot be tracked through the system because the system devices will likely discard or more such a data packet. Thus, truncation must be confined to those fields that, when modified, will not affect the validity of the data packet.

Consequently, truncation is often directed to the data payload of the data packet. In particular, because the size and content of the data payload are inherently variable, modifications to the data payload, such as by truncation, will not adversely affect the processing of the data packet by the devices of the high speed communications system. In the case of word aligned data streams for example, data payloads are typically truncated at a word boundary, so as to produce what is sometimes referred to as 'wordwise' truncation. Truncation in this manner is thus consistent with the nature of the data stream, and the devices in the high speed communications system are readily able to recognize the modified data packet and discern the truncation error.

However, it is desirable in some instances to 'fine tune' the truncation by truncating the data payload, for example, at a particular byte that occurs other than at a word boundary. Moreover, it may likewise be desirable to perform such truncation at various levels within the data packet such as, for example, at the IP and TCP levels. This is particularly so in the case of protocols, such as Gigabit Ethernet, that are based upon the use of unaligned data streams wherein the start of a data packet and/or one of its fields may occur at any byte within the data stream. Thus, because typical diagnostic systems and processes are generally only configured to implement wordwise truncation, and do not permit a user to truncate a data packet at the individual byte level, such systems and processes are inherently limited in terms of their flexibility.

BRIEF SUMMARY OF AN EXEMPLARY EMBODIMENT OF THE INVENTION

In general, embodiments of the invention are concerned with systems and methods for introducing user-defined errors in a designated data unit substantially in real time, so as to facilitate evaluation of the response of high speed data communications systems, such as those conforming with the Gigabit Ethernet protocol, to errors such as are exemplified in the modified data unit.

In one exemplary embodiment of the invention, a modification subsystem suitable for use in a high speed communications system is provided that includes a modification logic and state machine in communication with a command stack memory and one or more jamming mode registers.

In operation, the modification logic and state machine receives information concerning the alignment and location of the designated data unit and, when instructions are received from the trigger subsystem to modify the designated data unit, such as by truncation of one or more payloads of the designated data unit, the modification logic and state machine uses the received information to locate and identify the designated data unit in the incoming data stream. The modification logic and state machine then determines whether or not truncation of the designated data unit would be valid and, if so, truncates the designated data unit, as specified by settings in the jamming mode registers, and then closes and transmits the modified data unit. If the proposed modification is invalid, the truncation is aborted. In either case however, the designated data unit is transmitted downstream by the modification subsystem.

These and other, aspects of embodiments of the present invention will become more fully apparent from the following description and appended claims.

BRIEF DESCRIPTION OF THE DRAWINGS

In order that the manner in which the above-recited and other aspects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF SELECTED EMBODIMENTS OF THE INVENTION

Reference will now be made to the drawings to describe various exemplary embodiments of the invention. It is to be understood that the drawings are diagrammatic and schematic representations of such exemplary embodiments, and are not limiting of the scope of the present invention in any way, nor are they necessarily drawn to scale.

The present invention extends to high speed communications systems, methods and devices useful in validating various error checking or other fields of user-modified data, exemplarily implemented as modified data packets, transmitted in accordance with certain high speed communications systems protocols, such as the GigE protocol.

I. Exemplary Network Environment and Structure of Data Modification System

Figure 1:
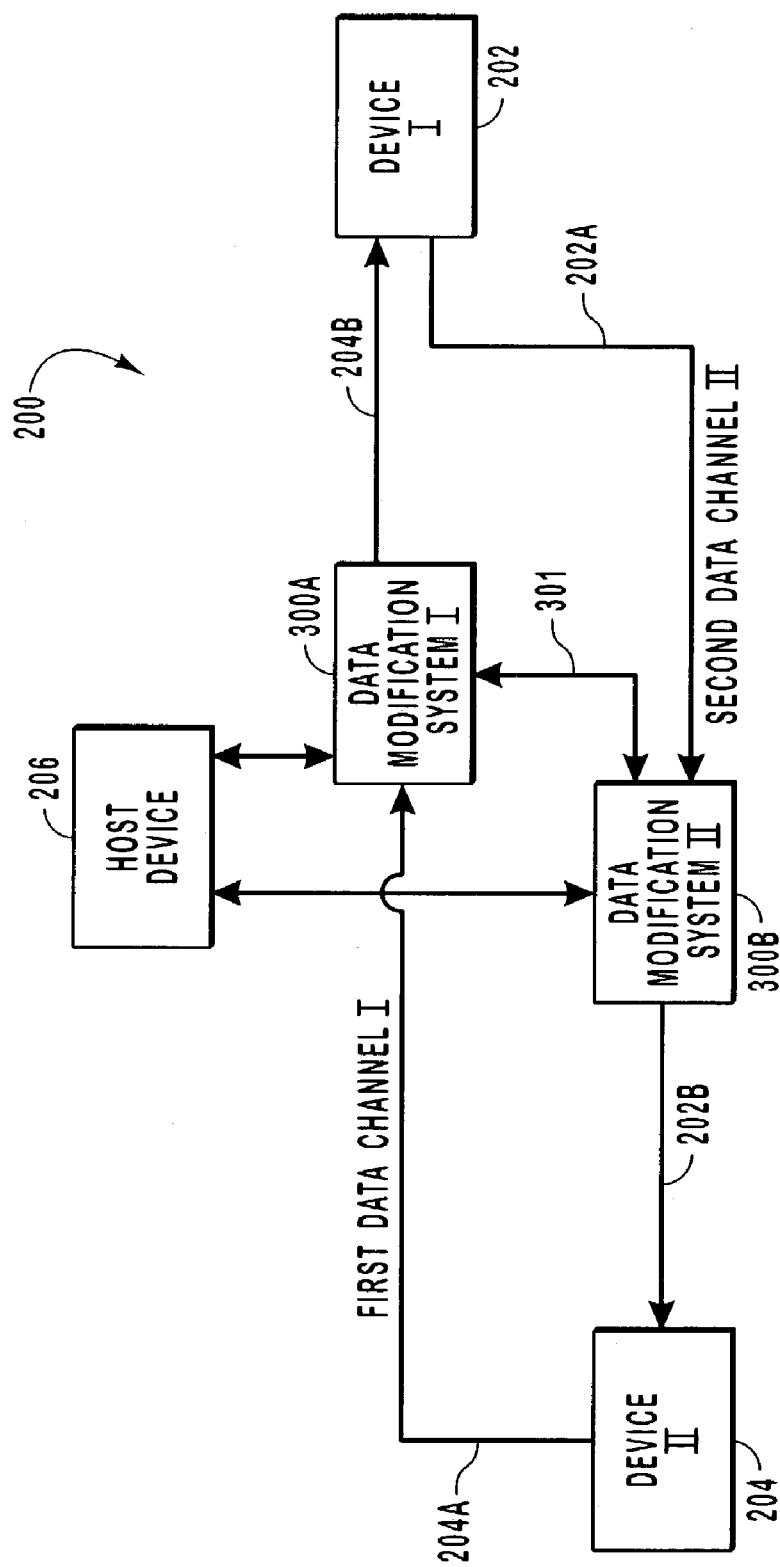
FIG. 1 is a block diagram that illustrates aspects of an exemplary embodiment of a high speed communications system having two or more network devices connected with each other by way of corresponding data modification systems.

FIG. 1 illustrates details concerning aspects of an exemplary embodiment of a high speed communications system (HSCS) 200. As noted above, exemplary high speed communications systems include LANs and WANs. In the illustrated embodiment, HSCS 200 comprises a dual channel configuration that includes a first data channel I, and a second data channel II. First data channel I and second data channel II have associated therewith device I 202 and device II 204, respectively, as well as data modification system I 300A and data modification system II 300B, respectively. Device I 202 and device II 204 communicate with each other by way of the data modification system I 300A and data modification system II 300B, and a host device 206 is further provided that communicates with data modification system I 300A and data modification system II 300B.

In connection with the foregoing, it should be noted that the data modification systems are, generally, configured to modify data that may take any of a variety of forms. Accordingly, embodiments of such data modification systems are, in the most general sense, concerned with data modification. As disclosed elsewhere herein, such "data modification" is implemented generally with reference to a designated portion, also referred to herein as a designated data unit, of the data stream. Exemplary data stream portions, or data units, that may be the subject of such a data modification process include, but are not limited to, data packets, data frames, and Ordered Sets. Of course, data modification may be implemented in other ways as well.

In operation, a data signal 202A is transmitted by device I 202 and received by data modification system II 300B which then modifies, if so directed, the data signal 202A in accordance with input received from the host device 206, input from 202A, and, in some cases, input of 204A into 300A, via crosstalk bus 301. At such time as any required modifications have been made to data signal 202A, a data signal 202B, reflecting such modifications, is then transmitted from data modification system II 300B to device II 204. Where no modifications are made to the data signal 202A, the data signal 202B passing out of the data modification system II 300B is identical to the input data signal 202A. Substantially the same process is performed by data modification system I 300A with respect to data signal 204A and modified data signal 204B.

In this way, user-specified modifications, input by way of host device 206, can be imposed on the data stream passing through one or both of first data channel I and second data channel II. Such changes can then be tracked through HSCS 200 and the response of HSCS 200 to the changes can be observed and evaluated. Such evaluations can then be employed to aid in the implementation of, among other things, remedial actions such as the reprogramming or modification of various performance-related, or other, aspects of the HSCS 200.

With respect to one exemplary aspect of the relation between data modification system 300A and data modification system 300B, it should be noted that embodiments of the invention provide for communication between data modification system 300A and data modification system 300B, as exemplified by crosstalk bus 301. Among other things, such cross-communication capability permits implementation of cross-triggering functionality between the data modification system 300A and data modification system 300B. Further details concerning aspects of such cross-triggering are provided elsewhere herein.

Figure 2:
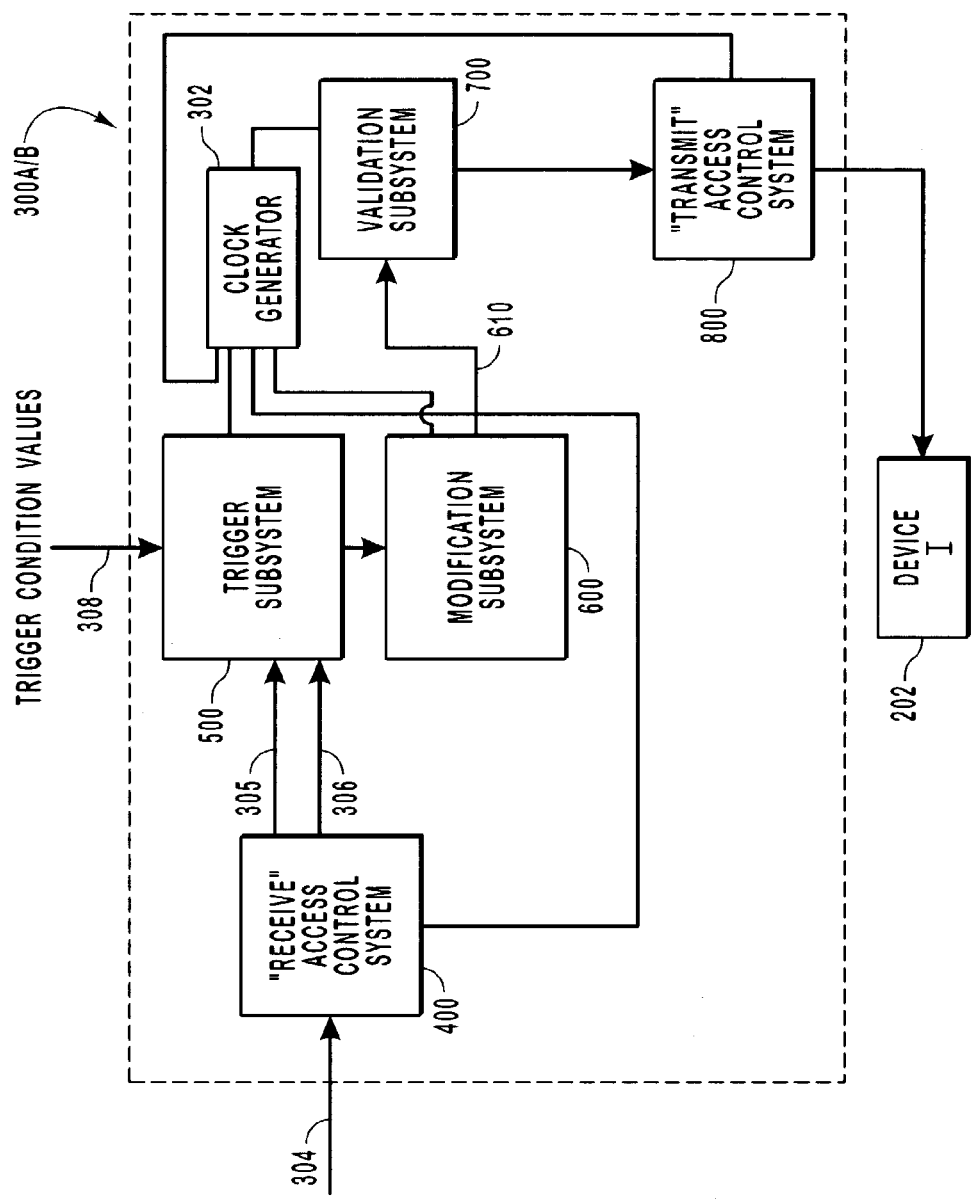
FIG. 2 is a block diagram that illustrates aspects of an exemplary embodiment of a data modification system that includes receive, and transmit, access control systems, a trigger subsystem, a modification subsystem, and a validation subsystem.

With attention now to FIG. 2, various aspects of an exemplary embodiment of the data modification system I 300A, which may also be referred to herein simply as "data modification system 300A," are illustrated. It should be understood that while the following discussion is presented in terms of data modification system I 300A, such discussion is equally germane to data modification system II 300B.

For purposes of illustration and discussion, in the embodiment shown, the data modification system 300A is adapted for compliance with the GigE physical specification, or protocol. However, aspects of the data modification system 300A are equally suited for use with other network protocols. Also, as will be described further, it is assumed for discussion purposes that the GigE data packets or data frames include various embedded protocols such as, but not limited to, Internet Protocol (IP) and Transmission Control Protocol (TCP). Again, additional or alternative protocols may likewise be employed.

In general, the data modification system 300A exemplarily includes a receive access control system 400 that includes a deserializer 401, a decoder 402, and a data alignment system 404 (see FIG. 3) configured for communication with each other. The receive access control system 400, in turn, is in communication with a trigger subsystem 500 and modification subsystem 600 of the data modification system 300A. The trigger subsystem 500 and modification subsystem 600 (also referred to as "trigger system" and "modification system"), which operate synchronously with clock generator 302, are considered in further detail below (see FIG. 2). Additionally, the data modification system 300A further includes a validation subsystem 700 in communication with the modification subsystem 600 and with a transmit access control system 800.

While a more detailed discussion of the structure and operation of the various components of data modification system 300A is provided below, it is useful at this juncture to briefly set out certain aspects of the general operational principles of the illustrated exemplary embodiment of data modification system 300A. More particularly, an input serial data stream 304 (exemplarily denoted at 202A and 204A in FIG. 1) is received by the receive access control system 400 which de-serializes, decodes and aligns the input serial data stream 304 (see FIG. 2) so that subsequent operations can be performed respecting the data stream by the trigger subsystem 500 and other components. Typically, both aligned and unaligned versions of the input data stream, denoted respectively at 305 and 306, are transmitted by the receive access control system 400 to the trigger subsystem 500. In general, the unaligned input data stream 306 proceeds along two paths inside the trigger subsystem 500. One path leads to the trigger logic of the trigger subsystem 500, while the data traveling along the other path is initially delayed and then passed to an output and on to the modification subsystem 600. As described in further detail elsewhere herein, this delay permits the trigger subsystem 500 to perform various processes and then align informational flags with the delayed data.

Further, various trigger condition values are input to the trigger subsystem 500, as schematically indicated at 308, and the trigger subsystem 500 searches for data or patterns in the incoming data stream that correspond to the trigger values. In the event that the triggering data or pattern is detected in the data stream, the trigger subsystem 500 then transmits a signal to the modification subsystem 600 in parallel with the triggering data in the data stream which the trigger subsystem 500 passes through to the modification subsystem 600. In response, the modification subsystem 600 performs one or more operations concerning the triggering data of the unaligned data stream 306. Subsequent to the performance of such operations, the data stream that includes the modified data is then passed to the validation subsystem 700 which, if necessary, evaluates the modified data, which may take the form of a modified data packet or a modified Ordered Set, or some other form, and updates the modified data as necessary to ensure its validity. The modified data is then passed to the transmit access control system 800 where it is prepared for transmission, on the physical network medium, to a network device.

In connection with the foregoing, it should be noted that the validation subsystem 700 can be configured so that its functionality is selectively implemented. For example, in at least one implementation, the validation subsystem 700 is configured such that its functionality is implemented during frame jam operations, but not during OS jam operations. It should likewise be noted that embodiments of the invention are generally suited for use in connection with various types or forms of data, of which data packets are but one example. Accordingly, the scope of the invention should not be construed to be limited to data packets, Ordered Sets, or any other particular type or form of data.

Figure 3:
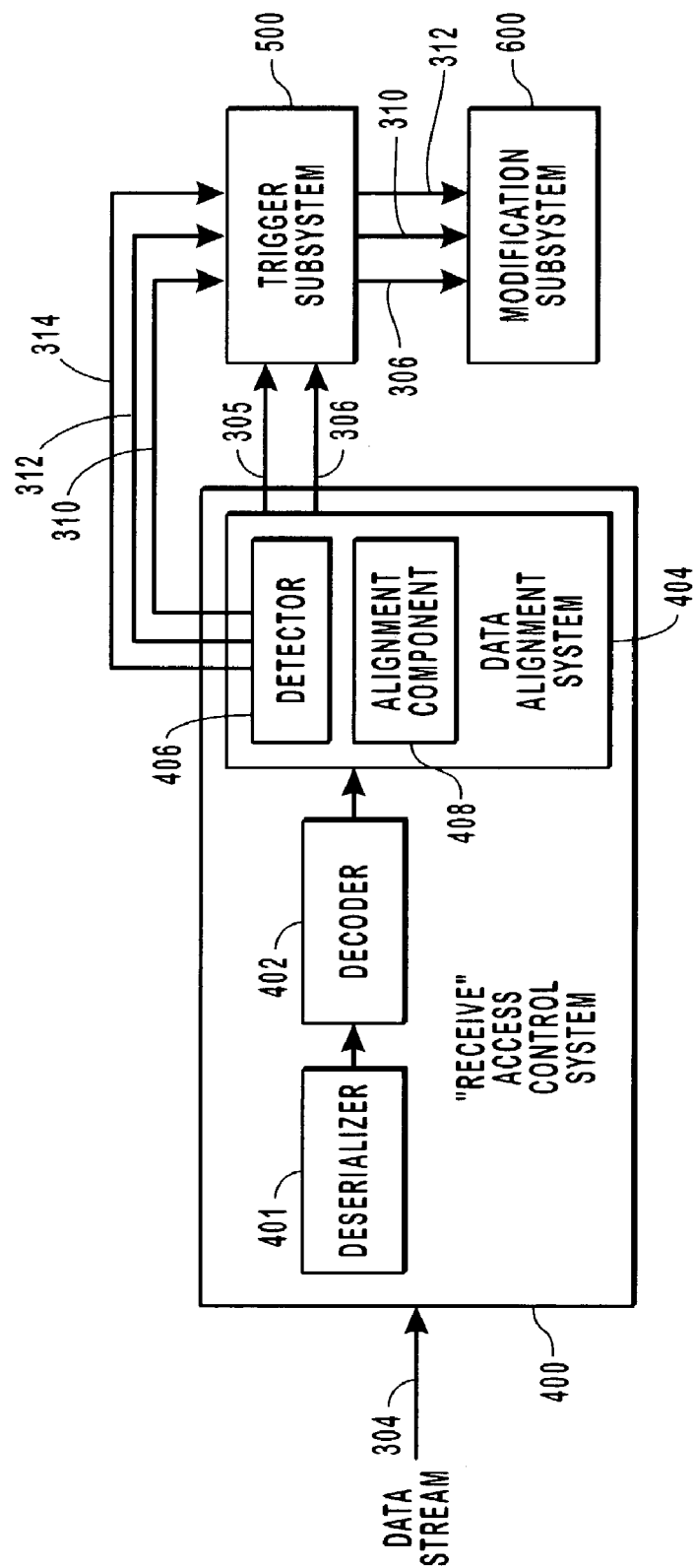
FIG. 3 is a block diagram that illustrates further aspects of an exemplary embodiment of a receive access control system that includes a deserializer, a decoder and a data alignment system.

Directing more particular attention now to the receive access control system 400 of the data modification system 300A, the exemplary embodiment of the receive access control system illustrated in FIG. 3 comprises a media access control (MAC) component that controls access to the physical transmission medium of the high speed communications system 200 (FIG. 1). In particular, the receive access control system 400 is configured to facilitate reception, and subsequent processing, of data frames or other types of data packets transmitted along the physical transmission medium.

Generally, the deserializer 401 of the receive access control system 400 is configured to receive an unmodified input data stream from the network medium (not shown), and to deserialize the incoming serial data stream. The deserialized data stream is then passed to a decoder 402 that serves to reformat some or all of the incoming data in some predetermined fashion. In general, the decoder 402 is configured to convert each bit of the unmodified input data stream into a predetermined form. In an exemplary embodiment of the high speed communications system employed in conjunction with a 32 bit data stream, the deserializer 401 is configured to convert the incoming unmodified input serial data stream into a stream of 40 bit datum, and the decoder 402 is configured to convert each 40 bit datum of the incoming unmodified input data stream into a decoded 32 bit datum, or word, for further processing. Of course, other de-serializing and decoding schemes may alternatively be employed, consistent with variables such as application, system, protocol, or data format requirements. Note that, as used herein, the term "datum" is used to generically refer to a single item of data, regardless of the type or format of such data.

II. Alignment of Data to Word Boundaries

After processing by the decoder 402, the decoded data stream passes to the data alignment system 404 of the receive access control system 400. Generally, the data alignment system 404 includes a detector 406 that is configured to locate and identify, within the decoded data stream received from the decoder 402, one or more Ordered Sets, one or more designated data packets, or portions thereof. Once the designated data packet, or portion, has been located and identified, an alignment component 408 of the data alignment system 404 acts to reposition or otherwise modify the designated data packet(s) or portions thus located and identified, in accordance with certain instructions. Realignment of Ordered Sets occurs as a result of the realignment of the data packet with which they are associated. In at least some embodiments, some or all aspects of the functionality of the data alignment system 404 are implemented substantially in real time. Moreover, the ability of the data alignment system 404 to perform these, and other, operations substantially in real time means that no material delay is imposed with respect to the line rate of the high speed communications system.

As suggested above, one aspect of embodiments of the invention concerns alignment of data streams so as to enable the implementation of triggering and other processes. Such alignment functionality is useful in cases where protocols, such as the GigE protocol, specify data words that are smaller than the 32 bit words typically employed by other protocols, such as the Fibre Channel protocol. More particularly, the GigE protocol provides for data frames that are aligned to 16 bits so that 16 bits are transmitted each clock cycle. However, while the GigE protocol has a variety of advantages and is widely employed, some network devices nonetheless operate more effectively and efficiently in situations where 32 bits of data is transmitted each clock cycle. Similarly, some network functionalities are more readily implemented where data streams provide for 32 bit words.

Thus, one aspect of embodiments of the invention is that, as a consequence of their ability to align 16 bit GigE data streams on 32 bit word boundaries, such embodiments are compatible with the 16 bit word structure associated with the GigE protocol, while being able, at the same time, to take advantage of operational and other efficiencies associated with the use of data streams aligned on 32 bit word boundaries. In one particular example, such alignment functionality permits the use of the same platform and hardware as the Fibre Channel platform and hardware, while also employing a desirable clock rate.

With the foregoing in view, consideration will now be given to some general aspects of the operation of the data alignment system 404 with respect to frame jamming. Generally, operations such as triggering are based upon the presence of a predetermined piece of data, or a pattern, occurring within the data stream. As noted elsewhere herein, embodiments of the invention are suited for use with data streams carrying data in groups of 32 bits. However, it is often the case that the portion of the data stream that it is desired to trigger on, and then align jamming to, is not aligned to the 32 bit word boundary.

Commonly, the alignment of such portion of the data stream is off, or out of sync, by 16 bits. Thus, the detector 406 is programmed to always look for data frames in the data stream. Once a data frame is found, the detector 406 provides the trigger subsystem 500 with a number of indicators regarding the frame. Some indicators 310 show the location of the frame in the data stream, while other indicators 312 provide information concerning the way in which the frame is aligned within the data stream.

As suggested earlier, the detector 406 also provides a separate new aligned data stream 305 in which the frame has been moved into a predetermined alignment position, along with information 314 regarding the location of the frame in this alternate data stream. The trigger subsystem 500 uses information 314 and the aligned data stream 305 to search for the predetermined triggering data. Among other things, the aligned nature of the data stream facilitates implementation of the triggering functionality of the triggering subsystem 500. After successfully triggering, the trigger subsystem 500 uses the information from 310 and 312 to place the EnJam signal (see FIG. 4) in the correct position parallel to the triggering frame in the unaligned data stream 306.

Only indicators 310 and 312, and the unaligned data stream 306, are then passed from the trigger subsystem 500 to the modification subsystem 600. Thus, when the modification subsystem 600 ultimately receives the unaligned data stream 306, along with 310 and 312, and signals indicating the presence of triggering data from the trigger subsystem 500, the modification subsystem 600 knows the location of, in the unaligned data stream 306, the frame that is to be modified, or jammed. Thus, embodiments of the invention are effective in implementing the functionality disclosed herein with only minimal changes to the data stream, since the data stream 306 has not been modified by an alignment process, and since only the specific predetermined data or pattern within the unaligned data stream 306 is jammed.

In ordered set ("OS") jamming scenarios, as compared with the frame jam scenario briefly outlined above, the processes are somewhat different. In particular, no alignment of the data stream is required. This is due to the fact that an OS is relatively small and it is a fairly simple matter for the triggering subsystem 500 to identify the OS in the unaligned data stream. As in the case of frame jam operations, when the triggering subsystem identifies the predetermined OS within the unaligned data stream, it uses the EnJam signal to communicate both the location and alignment of the predetermined OS to the modification subsystem 600 so that the modification subsystem 600 knows where to look, in the unaligned data stream 306, for the OS that is to be modified or jammed.

With the foregoing general discussion in view, attention will now be given to various further aspects of the data alignment system 404 and associated processes. As suggested earlier, various embodiments of the detector 406 of the data alignment system 404 may, depending upon variables such as the protocol of the high speed communications system, be hard coded to search for any of a variety of different types of data packets. By way of example, the designated data packet comprises, in some instances, a GigE data frame. In such cases, the detector 406 would accordingly be hard coded to search for any GigE data frame. As discussed in further detail below, any such GigE data frame that was detected would then be aligned by the alignment component 408. As another example, a predetermined portion of a data packet may comprise the start of a destination address that is embedded within the data packet, or may comprise an OS of the data packet. Such data packets and portions are exemplary only however and variously hard coded detectors 406 may be employed that are configured to search for other data packets and portions as well.

The particular alignment of the data packet within the data stream is dictated at least in part by the protocol with which the relevant high speed communications system conforms. By way of example, in the GigE protocol, the start of a data frame may occur at any byte of a given 32 bit data stream. Similarly, the start of various OSs or fields within such data frames can also occur at any byte of the data stream. Such data frames, fields, and ordered sets are sometimes referred to as being "unaligned" or not "word" aligned, because they are not aligned to be transmitted at the start of a clock cycle, as is the case with other protocols, such as the Fibre Channel protocol.

In addition to locating and identifying data packets within the data stream, the data alignment system 404 also looks within the data frame(s) to identify, for example, the locations of various fields, such as the preamble and CRC, that occur within the designated data frame(s), the location of special characters such as the Start of Frame Delimiter ("SFD"), and the locations of Ordered Sets such as, but not limited to, the start of packet (SOP) and the end of packet (EOP). As discussed in further detail below, this information is then provided to the trigger subsystem 500 and the modification subsystem 600, which thus enables the trigger subsystem 500 and the modification subsystem 600 to perform various jam operations based on knowledge of the location of such fields with respect to the unaligned version of the data stream 306.

In any event, once the detector 406 has located and identified a data packet, for example, of the network data stream, the detector 406 communicates with the alignment component 408 which, in general, is configured to align the data packet(s) for the purposes of arming or triggering, discussed further below. In one exemplary application, the alignment component 408 aligns a specified portion of a data frame at a 32 bit word boundary of the input data pipeline. Exemplarily, the portion of this data frame that is aligned at the word boundary is the first byte of the destination address field.

In this exemplary case then, the detector 406 identifies the position of the specified portion of the data frame within the 32 bit word, and the alignment component 408 then shifts the identified portion of the data frame to the beginning of a word, that is, to the position of the most significant byte within the word. In this case, the data alignment system 404 performs this operation with respect to the beginning of the destination address by identifying the byte representing the start frame delimiter (SFD). This particular byte is identified in this instance because it serves to indicate that the following byte is the start of the destination address, that is, the byte whose position is to be adjusted. In this particular instance, the position of the start of the destination address is then shifted by altering the length of the preamble that precedes the destination address. The alignment component 408 then continues to align the remainder of the frame in the same manner until the end of the frame is reached. More generally however, embodiments of the data alignment system 404 are capable of performing similar operations with respect to other fields and/or ordered sets of the data frame.

In the broader context, implementation of the functionality of the data alignment system 404 is not confined to GigE data frames and related systems. Instead, embodiments of the data alignment system 404 may be employed in any high speed communications application where it is desired to locate, identify, and/or reposition selected portions of a data stream substantially in real time. Moreover, the functionality of the data alignment system 404 is not confined to alignment of a single data packet, but more generally may be employed to align multiple data packets and/or data packet fields.

After the alignment process has been completed, the aligned data packet is then transmitted from the data alignment system 404 to the trigger subsystem 500, as indicated schematically at line 305. As discussed in further detail below, the trigger subsystem 500 then uses the aligned data packet to locate and identify any data patterns in the network data stream that correspond to a trigger condition. Such data patterns are then used to generate corresponding instructions to the modification subsystem 600 of the data modification system 300A. In connection with the foregoing, the data alignment system 404 of the receive access control system 400 is also configured, in at least some exemplary embodiments, to further pass an "unaligned" version of the incoming data stream to the trigger subsystem 500 and to the modification subsystem 600, as schematically indicated at line 306. Further details concerning the use of these unaligned data streams are provided below.

III. Operation of Data Modification System

Figure 4:
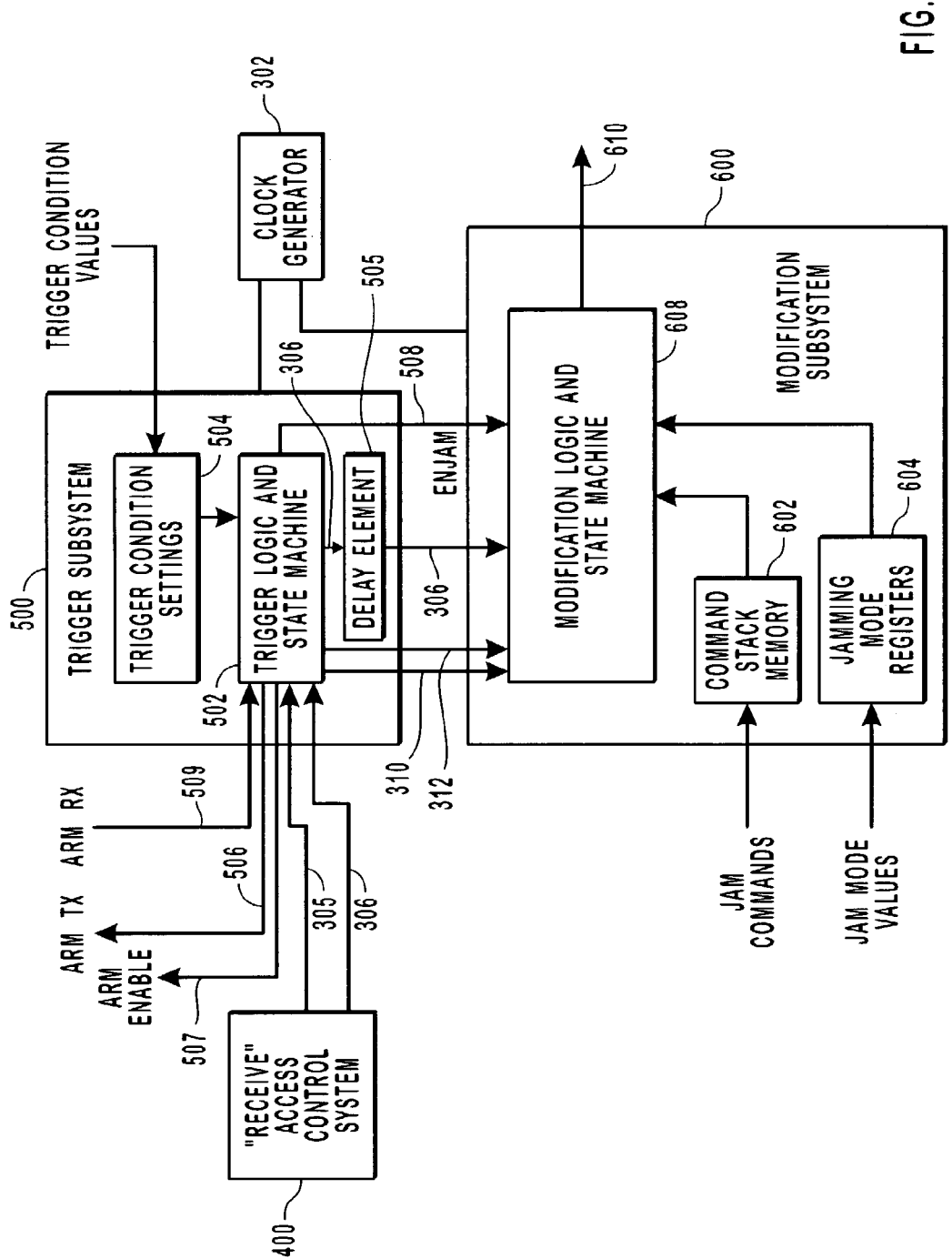
FIG. 4 is a block diagram that illustrates further aspects of exemplary embodiments of a trigger subsystem and a modification subsystem.

With attention now to FIG. 4, details are provided concerning various structural and operational aspects of an exemplary embodiment of a data modification system 300A, directing attention first to the trigger subsystem 500. As indicated in the exemplary illustrated embodiment, the trigger subsystem 500 includes a trigger logic and state machine 502 in communication with various trigger condition settings 504, and further includes a fixed delay element 505.

In operation, a device such as host 206 (FIG. 1) loads various trigger condition values into the trigger condition settings 504 in accordance with the particular testing plans of a user. By way of example, the trigger condition settings 504 may be loaded with one or more data patterns that will be used to identify an arm and/or a trigger condition. In this example, the trigger logic and state machine 502 accesses the condition information stored in the trigger condition settings 504 and compares that condition information with the incoming data stream. In the event that the trigger logic and state machine 502 identifies a match between the conditions stored in one or more of the trigger condition settings 504 and the data carried in the incoming data stream, then a trigger condition is said to have occurred, indicating that at least a portion of the data stream is to be altered in some way by the modification subsystem 600.

Depending upon the requirements of a particular application, the trigger subsystem may be configured to provide various triggering functionalities. For example, in some embodiments, a single level triggering functionality is provided so that upon satisfaction of a single trigger condition, the modification subsystem 600 is commanded to modify the data stream in some corresponding fashion. In another exemplary embodiment, a two-level triggering function is implemented that provides for a first-level, or 'arm,' trigger, and second-level trigger, or simply 'trigger.' Moreover, at least some implementations enable cross-triggering functionality, such as between data modification system I 300A and data modification system II 300B, as exemplified through the use of the Arm TX, Arm Enable and Arm RX signals, 506, 507 and 509 (see FIG. 4), respectively, so that a triggering event detected at one data modification system can be used as the basis for performing a jam at the other data modification system.

Aspects of each of the aforementioned exemplary embodiments are illustrated in FIGS. 4 and 5A through 5D, wherein FIG. 4 generally provides various details concerning the arrangement of various aspects of the trigger subsystem 500 and modification subsystem 600, as well as their relationship with each other, while FIGS. 5A through 5D illustrate aspects of logical operations that make up exemplary triggering processes.

With attention first to FIG. 5A, details are provided concerning various aspects of an exemplary single level triggering operation. At the initial stage 550, a determination is made as to the type of triggering that is to be implemented. The host 206 (see FIG. 1) programs the trigger condition settings 504 (see FIG. 4) and the process advances to stage 552 where the trigger condition settings have been configured. When the host sets the 'Run' signal, the process advances to stage 554 where triggering is enabled. The trigger condition settings provide trigger condition information to the trigger logic and state machine 502 (see FIG. 4). The trigger logic and state machine idles, as schematically indicated by TC-bar, until the TC trigger condition is satisfied. Upon satisfaction of the TC trigger condition, the trigger logic and state machine asserts the EnJam signal to indicate the trigger position to the modification subsystem 600. The trigger logic and state machine continues in stage 554 repeatedly looking for trigger conditions until the host removes the 'Run' signal or the modification subsystem indicates that jamming is complete, as indicated by the 'Jam Done' signal. At this point, the process then concludes at stage 556.

In addition, or as an alternative, to the single level triggering operations illustrated in FIG. 5A, embodiments of the invention provide for dual level triggering as well, in both the 'native' arming and 'alien' arming modes. Directing attention now to FIG. 5B, details are provided concerning various aspects of some exemplary dual level triggering operations.

At the initial stage 560, a determination is made as to the type of triggering that is to be implemented. In particular, the dual level triggering operation can be set up to take place in response to either a 'native' arming triggered at the trigger logic and state machine, or in response to an 'alien' arming resulting from cross-triggering by a trigger logic and state machine that exists in a partner data modification system, such as data modification system II. In general, these exemplary dual triggering operations specify an initial 'arm' condition that, when met, causes the trigger logic and state machine to enter an armed state where satisfaction of a second trigger condition will result in assertion of the 'EnJam' signal by the trigger logic and state machine.

In the event that native arming is desired, the host programs the trigger condition settings and the process advances to stage 562 where the trigger condition settings have been configured. When the host sets the 'Run' signal, the process advances to stage 564 where arming is enabled. As noted earlier, the trigger condition settings provide trigger condition information to the trigger logic and state machine. The trigger logic and state machine idles, as schematically indicated by TC1-bar, until the trigger condition TC1 is satisfied.

Satisfaction of the TC1 condition results in the process then advancing to stage 566 where the trigger logic and state machine checks to see if the second level trigger condition is met. The trigger logic and state machine then idles, as schematically indicated by TC2-bar, until the TC2 trigger condition is satisfied. Upon satisfaction of the TC2 trigger condition, the trigger logic and state machine asserts the 'EnJam' signal to indicate the trigger position to the modification subsystem. The trigger logic and state machine returns to stage 564 repeatedly looking for arm and then trigger conditions until the host removes the 'Run' signal or the modification subsystem indicates that jamming is complete, as indicated by the 'Jam Done' signal. At this point, the process then concludes at stage 568.

Figure 5D:
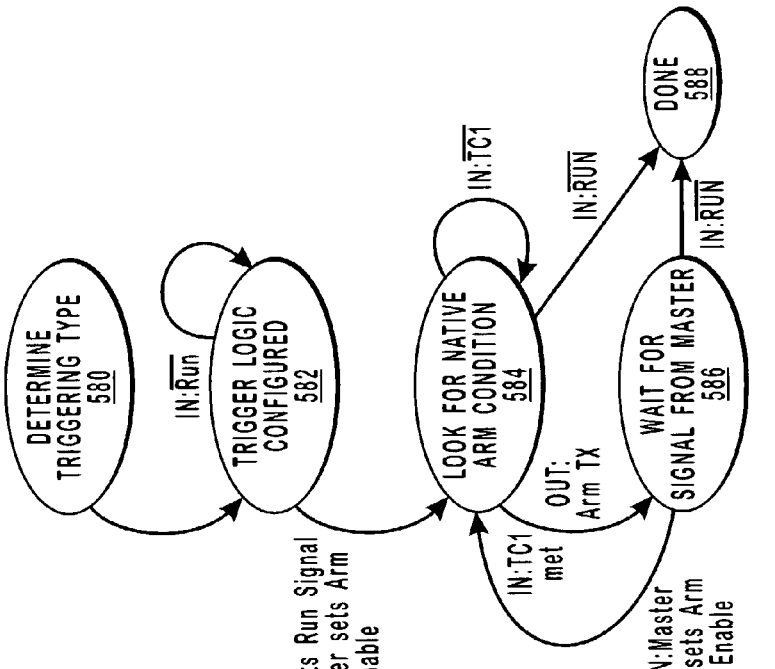
FIG. 5A is a state diagram illustrating various aspects of an exemplary single level triggering operation with no timeout.
FIG. 5B is a state diagram illustrating various aspects of an exemplary dual level triggering operation with native arming, with or without timeout.
FIG. 5C is a state diagram illustrating various aspects of an exemplary dual level triggering operation with alien arming, with or without timeout.
Figure 5C:
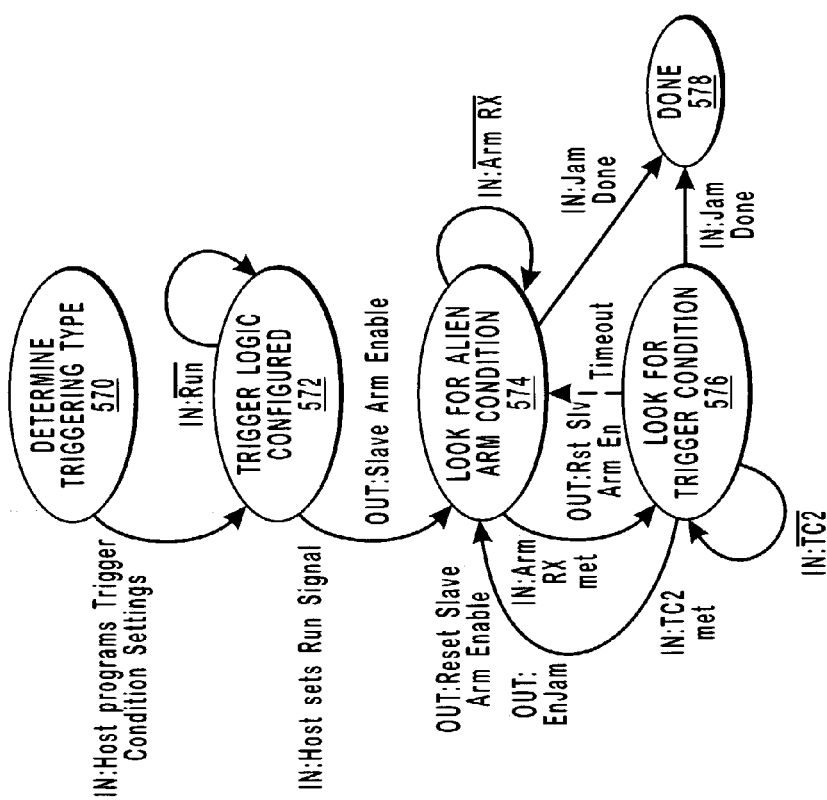

Dual level triggering, in the 'alien' arming mode, proceeds in a similar fashion, and an example of such triggering is shown in FIG. 5C. At stage 570, a determination is made as to the type of triggering that is to be implemented and the host programs the trigger condition settings. The process then advances to stage 572 where the trigger condition settings have been configured. When the host sets the 'Run' signal, the process advances to stage 574 where arming is enabled by the output of a 'Slave Arm Enable' signal, which is sent to the partner (slave) data modification system II through the crosstalk bus 301 (see FIG. 1). The trigger logic and state machine idles, as schematically indicated by Arm RX-bar, until the Arm condition in the slave data modification system is satisfied, and the trigger state machine receives the 'Arm RX' signal from the crosstalk bus.

In connection with the foregoing discussion of the 'Slave Arm Enable' signal, it should be noted that arming is enabled, by the output of the 'Slave Arm Enable' signal, any time that the process moves from stage 576 back to stage 574. This may occur, for example, upon satisfaction of TC2, or as a result of a timeout having occurred.

In any case, satisfaction of the Arm condition results in the process then advancing to stage 576 where the trigger logic and state machine checks to see if the second level trigger condition is met. The trigger logic and state machine then idles, as schematically indicated by TC2-bar, until the TC2 trigger condition is satisfied. Upon satisfaction of the TC2 trigger condition, the trigger logic and state machine asserts the 'EnJam' signal to indicate the trigger position to the modification subsystem 600. The trigger logic and state machine returns to stage 574 repeatedly looking for arm and then trigger conditions until the host removes the 'Run' signal or the modification subsystem indicates that jamming is complete, as shown by the 'Jam Done' signal. At this point, the process then concludes at stage 578.

In addition to providing for single and multiple level triggering operations, some exemplary embodiments of the invention further enable specification of a variety of conditions so as to permit customization of the triggering operation to a particular application or set of operating conditions. Such conditions may include, for example, a timeout aspect where the requirement exists that a defined trigger condition occurs within a set period of time relative to the occurrence of another trigger condition. Aspects of one such arrangement are indicated in FIGS. 5B and 5C. If a timeout occurs while the trigger logic and state machine is in stage 566 or 576, the trigger logic and state machine aborts looking for TC2 and returns to look for the Arm condition, whether it be native or alien. In the case of alien arming, upon timeout, the trigger logic and state machine also resets the 'Slave Arm Enable' signal that goes through the crosstalk bus to the slave data modification system, in order to return the slave to the correct stage.

FIG. 5D provides details regarding the trigger logic and state machine stages for a slave data modification system being used in dual level triggering. The host programs the trigger condition settings at stage 580 and the process advances to stage 582 where the trigger condition settings have been configured. When the host sets the 'Run' signal and the 'Slave Arm Enable' signal is received from the master through the crosstalk bus, the process advances to stage 584 where arming is enabled. The trigger condition settings provide trigger condition information to the trigger logic and state machine. The trigger logic and state machine idles, as schematically indicated by TC1-bar, until the trigger condition TC1 is satisfied. Satisfaction of the TC1 condition a results in the process then advancing to stage 586 where the trigger logic and state machine waits for a signal from the master. The trigger logic and state machine idles until a signal is received. Each time the 'Arm Enable' signal is reset, the trigger logic and state machine returns to stage 584 repeatedly looking for arm conditions until the host removes the 'Run' signal or the master fails to reset the 'Arm Enable' signal. When the 'Run' signal is removed, the process then concludes at stage 588.

Note while the aforementioned embodiments depict aspects of exemplary single and dual-level triggering operations, both with and without timeout, the scope of the invention should not be construed to be so limited. Rather, embodiments of the invention may be configured to require any of a variety of combinations of conditions to be satisfied before triggering and/or jamming operations are actually implemented. In similar fashion, any number and combination of different trigger conditions may likewise be defined and specified.

Further details are now provided concerning various aspects of an exemplary EnJam signal 508. As noted elsewhere herein, it is the case with certain protocols, such as GigE, that the data frame is not "word" aligned, as is the case with other protocols, such as the Fibre Channel protocol. In GigE systems for example, ordered sets (OS) may be as small as 1 byte (8 bits) and, moreover, may sometimes be positioned anywhere within a 32 bit word. In order to accurately and precisely manipulate a given 32 bit word, such as in response to assertion of an EnJam signal for example, it is useful to ascertain precisely where in the 32 bit portion of the incoming data stream the location of a particular ordered set or field occurs, or where the data frame begins.

Once the location of the OS or field, or the location of the data frame start, is known, the actual jam pattern can then be inserted at the correct position within the corresponding 32 bit word. Thus, one useful aspect of some embodiments of the EnJam signal is that the EnJam signal may be formatted in such a way as to provide an indication of the location, within the relevant 32 bit word(s) for example, where the actual condition(s) that was the basis for assertion of the EnJam signal, has occurred. More particularly, an exemplary EnJam signal 508 is provided in the form of a bus with a plurality of signal lines. In this exemplary case, the bus is 4 bits wide, and may thus be employed to indicate where, within an incoming 32 bit word, a particular trigger condition is detected.

To briefly summarize certain aspects of the foregoing discussion then, if a trigger condition is satisfied, an EnJam signal 508 is asserted by the trigger logic and state machine 502 and then directed to the modification logic and state machine 608, indicating that a modification to the data stream is to be implemented. In addition, the format of the EnJam signal 508 may be used, in at least some exemplary embodiments, to indicate the location of the trigger within the incoming word, be it an ordered set or a data frame.

With continuing attention to FIGS. 4 and 5A through 5D, further details are provided concerning the utilization of the EnJam signal 508 as it relates to the structure and operation of the modification subsystem 600. Typically, the modification subsystem 600 operates in a 'pass-through' mode that allows the incoming data stream 306 to pass without any modification. The modification subsystem 600 only modifies, or jams, data of the incoming data stream in the event that a jamming event, signaled by the assertion of EnJam 508 by trigger logic and state machine 502, is triggered by the occurrence of one or more trigger conditions.

In the illustrated exemplary embodiment, the modification subsystem 600 includes a command stack memory 602 and one or more jamming mode registers 604. In general, the command stack memory 602 stores jamming commands, repeated as necessary, that each pertain to a successive data word in the incoming data stream, and the jamming mode registers 604 store commands that globally apply to all the jams in general. By way of example, the command stack memory 602 and the jamming mode registers 604 may indicate that a "replace OS jam" command is to take place, wherein the specified OS is to be replaced with a particular value stored in the command stack memory 602. Of course, additional or alternative jamming commands may be employed, consistent with particular system or protocol requirements, or other relevant requirements.

As noted earlier, the trigger subsystem 500 includes a delay element 505 through which the data stream 306 passes on its way to the modification subsystem 600. With continuing reference now to the illustrated embodiment of the modification subsystem 600, the delay element 505 receives the "unaligned" version of the input data stream from the trigger logic and state machine 502 as schematically indicated by line 306. Again, this is essentially a "passed through" version of the input data stream 304 (FIG. 2). The delay element 505, which can be implemented with a FIFO or any other suitable delay circuit, imposes a pipeline delay on the incoming data stream 306 for a $predetermined amount of time. This delay provides the time needed to align the passed-through data signal 306 with the EnJam signal 508 asserted by the trigger logic and state machine 502.

Generally, aspects of the time delay should be consistent with the particular trigger conditions that have been defined. Thus, in one exemplary embodiment, the delay is approximately 46 words, although the length of the delay may vary based on, for example, the particular implementation of the trigger subsystem 500. As another example, the length of the delay must be sufficient to allow for deep trigger conditions. That is, in cases where a trigger decision is based upon data located deep within a data frame, such as near the end of the data frame, then the time delay must be correspondingly long so as to allow time for the entire designated data frame to be evaluated. Of course, both the delay and the trigger depth may be fixed to particular values such as may be required by a particular application.

As suggested above, the data stream passes unaltered through the delay element 505 and the modification logic and state machine 608 and into the validation subsystem 700, as schematically indicated by line 610, so long as EnJam 508 remains inactive. However, when the EnJam signal 508 is enabled, thereby indicating occurrence of a trigger condition, the modification logic and state machine 608 enters the jamming mode.

Generally, when in the jamming mode, the modification logic and state machine 608 obtains configuration information from the jamming mode registers 604 and, in accordance with the particular jam command(s) in the command stack memory 602, commences modification of the data stream as the data stream passes through the modification logic and state machine 608. In connection with the foregoing, it was previously noted that, in addition to placing the modification logic and state machine 608 in a jamming mode, the EnJam signal 508 also serves to indicate to the modification logic and state machine 608, down to the byte level, precisely where within the corresponding 32 bit datum the trigger event occurred. Correspondingly, the modification logic and state machine 608 is able to perform jams at granularities as fine as the bit level, based upon the information provided by the EnJam signal 508. Moreover, such bit level jams can be implemented notwithstanding that the modification logic and state machine 608 is processing the data stream in quantities of 32 bit datums.

Figure 6:
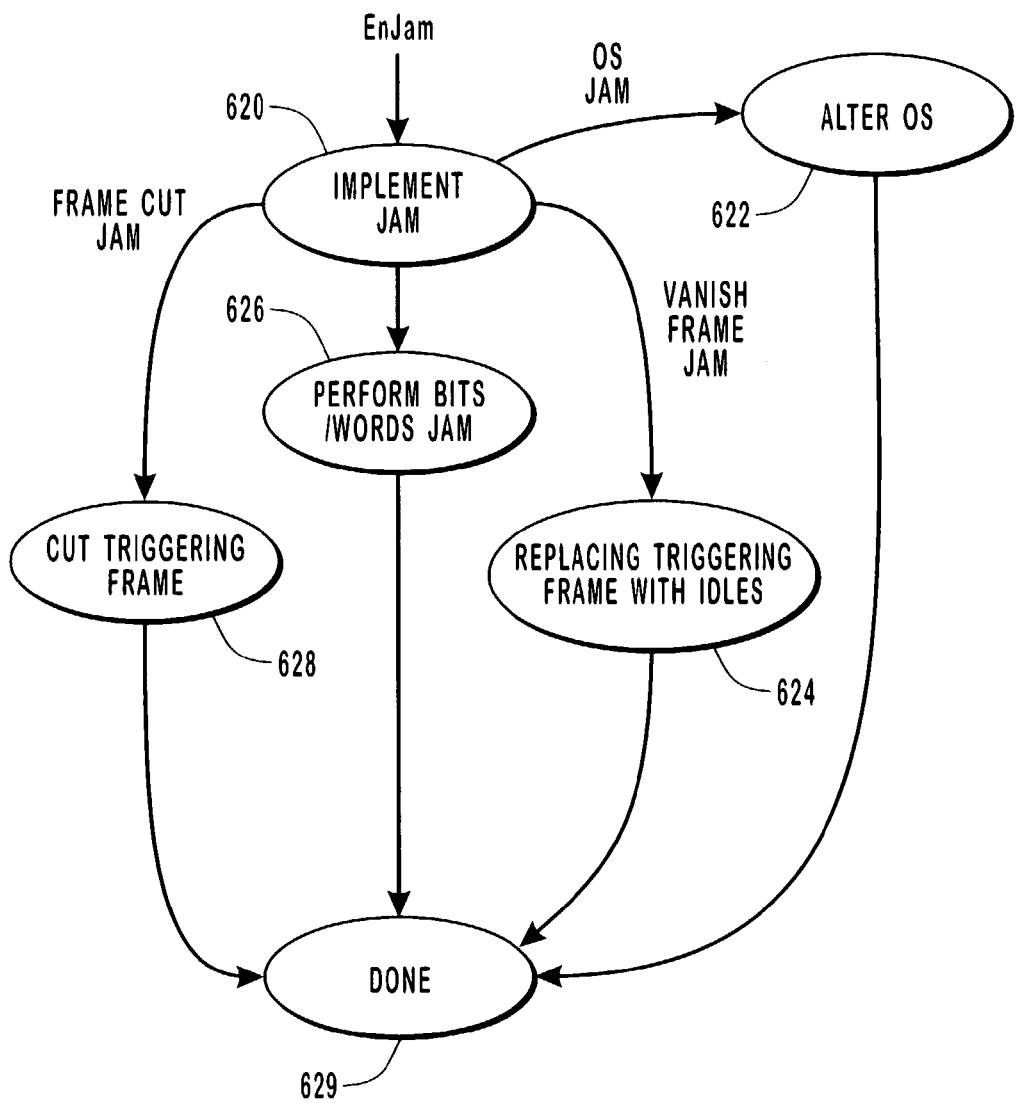
FIG. 6 is a state diagram illustrating various aspects of exemplary jamming operations.

Directing attention now to FIG. 6, and with continuing attention to FIG. 4, details are provided concerning exemplary jams that may be implemented in connection with assertion of the EnJam signal 508. Initially, the host (see FIG. 1) determines the jam mode to be employed, based upon user input. The host then programs the appropriate settings into the command stack memory and/or the jamming mode registers of the modification subsystem, thus configuring the jam logic. When the Run command is transmitted by the trigger logic and state machine to the modification logic and state machine, the modification logic and state machine then moves to a state where it is configured, and ready, to implement a jam in response to receipt of the Enjam signal. At such time as the modification logic and state machine receives the Enjam signal, the process enters stage 620 where the specified jam is implemented. As indicated in FIG. 6 and discussed in further detail below, various types of jams may thus be implemented. Exemplary jam modes illustrated in FIG. 6 include modes that result in the modification of Ordered Sets, or one or more aspects of a data frame such as, but not limited to, bits/words jams, vanish frame jams, as well as frame cut jams that involve truncation of a data payload, such as a TCP or IP data payload, of a GigE data frame, collectively "frame jams."

In the event that OS type jamming is selected, for example, the trigger logic and state machine 502 is configured to trigger on one or more K/D character(s) of some sort, and may additionally be configured to allow triggering on single, double, or four byte ordered sets. When a trigger condition is met for a single byte trigger condition, a single EnJam bit is set corresponding to the location of the trigger condition in the data bus, and the modification logic and state machine 608 moves to stage 622. Note that the occurrence of this type of condition could result in all four bits being set in one word, if the trigger condition is met with all four bytes. In a dual byte trigger condition for example, a single EnJam bit is set corresponding to the first byte of the two byte match, that is, either byte 3 or byte 1.

EXAMPLES

|  | Data | EnJam |
| --- | --- | --- |
| Trigger on R: | RXRR | 1011 |
| Trigger on I2: | XXI2 | 0010 |
| Arm on R, | XXRX | 0000 |
| Trigger on R: | XRXX | 0100 |

Thus, as illustrated by the foregoing examples, bit 3 corresponds to a trigger condition match in byte 3 of the word, and so forth. Upon completion of the OS Jam, the modification logic and state machine 608 moves to stage 629.

As an alternative to OS type jamming, various other types of frame jamming may be selected. In one exemplary frame jamming operation, the trigger logic and state machine 502 (FIG. 4) is configured to trigger on a GigE data frame. Similar to the a case of OS jamming, the logic also sets the correct bit on the EnJam signal 508 bus so as to indicate the location of the start of the GigE data frame within the 32 bit word.

For example, in one exemplary embodiment, the bit corresponding to the byte location of the 8-bit "SOP" OS within the 32 bit word is asserted. In this exemplary embodiment, this should only occur in byte 3 or byte 1. Such assertion allows the modification logic and state machine 608 to modify this OS as part of a frame jam. Additional jamming may be selected for other parts of the frame. A signal from the receive access control system 400 that is passed along parallel to the data stream is used to determine the location of the Start Frame Delimiter (SFD) portion of the GigE data frame. Once the location of the SFD is known, the relative position of the other fields, such as the data payload, within the data frame can be readily derived by making reference to the relevant protocol which serves to, among other things, define standard frame configurations.

With continuing reference to FIG. 6, various frame jam modes may be employed. For example, if a vanish frame jam is desired, the modification logic and state machine 608 moves from stage 620 to stage 624 and replaces the triggering frame(s) with an appropriate number of idles, as dictated by the relevant protocol. After replacement of the triggering frame, the modification logic and state machine 608 moves to stage 629.

If, on the other hand, a bits/words jam is desired, the modification logic and state machine 608 moves from stage 620 to stage 626 where the bit/word jam is performed. Upon completion of the bit/word jam, the modification logic and state machine 608 then moves to stage 629.

In the event that a frame cut jam is desired, the modification logic and state machine 608 moves from stage 620 to stage 628 where the designated data frame is truncated in some manner, and then to stage 629 upon completion of the frame cut jam. While this frame cut jam mode, as described below, is particularly useful when implemented in the context of the GigE protocol, it may likewise be employed in connection with various other compatible protocols as well.

More generally, such frame cut type truncation jams may be employed with respect to a variety of different fields of one or more designated data frames, or other type of data packet, carried in a network data stream, provided that the truncation does not remove or modify those fields of the data frame that are required for processing of the data frame by the high speed communications system, such as the destination address for example. That is, while an error may desirably be introduced into a data frame by way of a data frame field truncation, the truncation preferably should not be implemented in such a way as to result in an invalid data frame that, for example, would not be recognized or processed by a high speed communications system connected device. In particular, if the frame is rendered invalid, then that frame will be rejected, prematurely, by the "lower level layers" in the device(s) under test and, accordingly, the frame cannot pass by those layers and move on to the higher level layers as would be necessary to enable testing of equipment/system responses at those higher layers. In this regard, the inability to track the modified data frame may, in some instances, result in impairment of the performance of various diagnostic, analytical, and remedial processes concerning the high speed communications system.

IV. Truncation of Payloads

Consistent with the foregoing, some exemplary embodiments provide for truncation of fields such as, but not limited to, data payloads. Generally with respect to the embodiment illustrated in FIG. 4, the modification logic and state machine 608 receives a signal, such as the EnJam signal 508 for example, that directs the modification logic and state machine 608 to jam a data frame in accordance with jamming settings contained in the jamming mode registers 604. In this exemplary embodiment, the jamming settings indicate that a truncation is to be performed on the data payload of a particular data frame. In this exemplary jamming implementation, triggering typically occurs singularly, or one frame at a time. The same is likewise true with respect to the corresponding frame jam. In yet other cases however, multiple jams may be implemented.

The modification logic and state machine 608 will then perform various checks on the designated data frame in order to determine the validity of the proposed truncation, because, as noted herein, an invalid frame generally is of limited value in troubleshooting and diagnostic evolutions concerning the high speed communications system 200 (FIG. 1). If the proposed truncation is determined to be valid, the truncated portion of the data payload will be replaced with a constant value, such as the idle Ordered Set of the protocol.

In at least some exemplary embodiments, truncation jams such as those generally described above are performed substantially at line speed so that there is little or no material impact on the data transmission rate of the high speed communications system. As discussed in further detail below, such truncation is implemented, in some cases, at the byte level within the data stream. In yet other cases, the truncation is implemented at the word level so that a command to truncate to two words, for example, would result in deletion of everything in the applicable data payload after the first two words.

More generally, exemplary truncation schemes are disclosed that are well suited for use in connection with data packets having a layered construction such that data payloads are present at various levels within the data packet. Among other things, such truncation schemes permit a user to select, within a given data packet, the level at which a payload truncation will be implemented. In at least one exemplary implementation, the modification logic and state machine 608 is configured, in the truncation jam mode, to truncate a data payload included in a TCP/IP over GigE data frame.

Generally, the construction of a TCP/IP data frame reflects a three layer scheme. Specifically, the GigE data frame includes a GigE header and GigE payload. Within the GigE payload is disposed an IP frame consisting of an IP header and IP payload. A TCP frame consisting of a TCP header and TCP payload are disposed within the IP payload. As discussed below in connection with FIGS. 7A through 7C, implementations of the invention are configured to enable payload truncation at any one of the foregoing levels within the TCP/IP data frame.

Figure 7A:
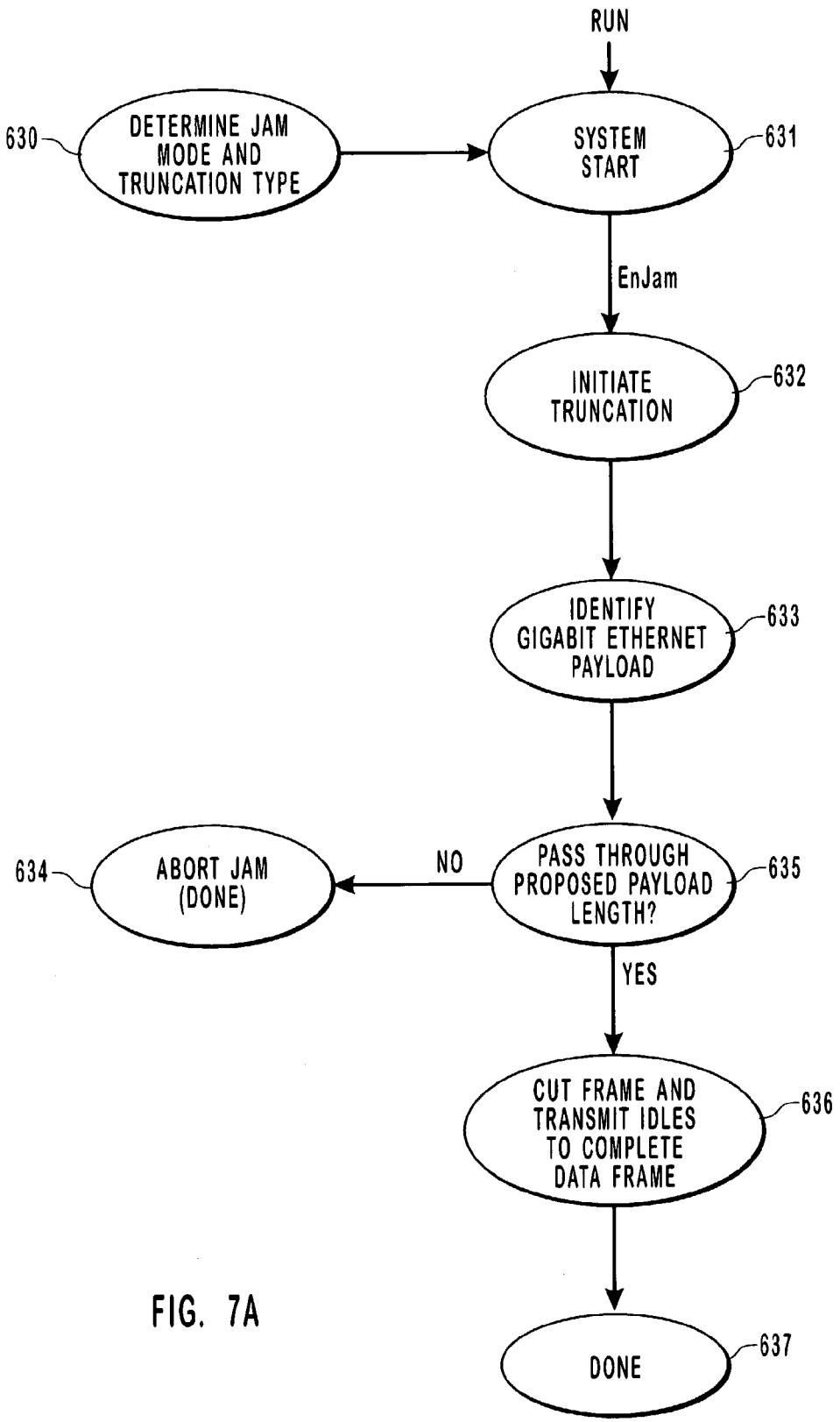
FIG. 7A is a state diagram illustrating various aspects of an exemplary truncation jam operation where the truncation occurs at the GigE data frame level.

With particular reference first to FIG. 7A, and with reference as well to FIG. 4, details are provided concerning a process where the data payload of a GigE data frame is truncated at the GigE level of the data frame. In this exemplary implementation, the process begins at stage 630 where the host determines the jam mode and truncation type to be employed. When the Run signal is asserted, the process advances to stage 631 and the system is started. Upon assertion of the EnJam signal, the process moves to stage 632 where the desired truncation is initiated.

The modification logic and state machine 608 then advances to stage 633. At this stage, the modification logic and state machine 608, guided by the GigE protocol, identifies the GigE payload by counting through the GigE header, which always comprises a standard number of bytes, until the GigE payload is encountered. After the GigE payload has thus been identified, the process advances to stage 635 where the modification logic and state machine 608 passes through the frame proposed to be truncated, up to the point that delimits the proposed truncation length. If the modification logic and state machine 608 encounters the end of the original frame prior to the point delimiting the proposed truncation length, such a result indicates that the original frame was shorter than the proposed truncation length. In this case, the process will abort at stage 634. On the other hand, if the modification logic and state machine 608 passes through the proposed payload length without encountering the end of the original frame, then the proposed truncation is valid and can be performed. The process then advances to stage 636 where the frame is cut and terminated as required by the proposed truncation and the modification logic and state machine 608 then further transmits idles, or "I2" Ordered Sets, corresponding to the portion of the GigE payload that was truncated, wherein the number of idles, or "I)2" Ordered Sets, transmitted corresponds to the length of that portion of the payload that has been removed. If no repeat jam, discussed below, is to be performed, the process then terminates at stage 637.

Thus, except for those error check fields that still require updating by the validation subsystem as a result of the truncation(s) implemented by the modification logic and state machine 608, the modified data frame that is ultimately transmitted from the modification logic and state machine 608 is valid in every other respect and differs only from the unmodified frame in terms of the data payload configuration, which is inherently variable in any event.

As indicated by the foregoing discussion, the exemplary process illustrated in FIG. 7A concerns a single implementation of a Gigabit Ethernet frame jam. Frame jam processes may be implemented in other ways as well however. For example, some embodiments of the invention provide for repeat frame jamming. With reference to the exemplary case depicted in FIG. 7A, the illustrated process would not, in the case of a repeat jam, simply terminate at stage 637. Instead, after truncation of the frame at stage 636, the process would return to stage 631 to begin another jam. More generally then, embodiments of the invention provide for single, or one-time, frame jams, as well as for processes where two or more jams are implemented in serial fashion. The foregoing is equally germane to the exemplary processes illustrated in FIGS. 7B and 7C.

Figure 7B:
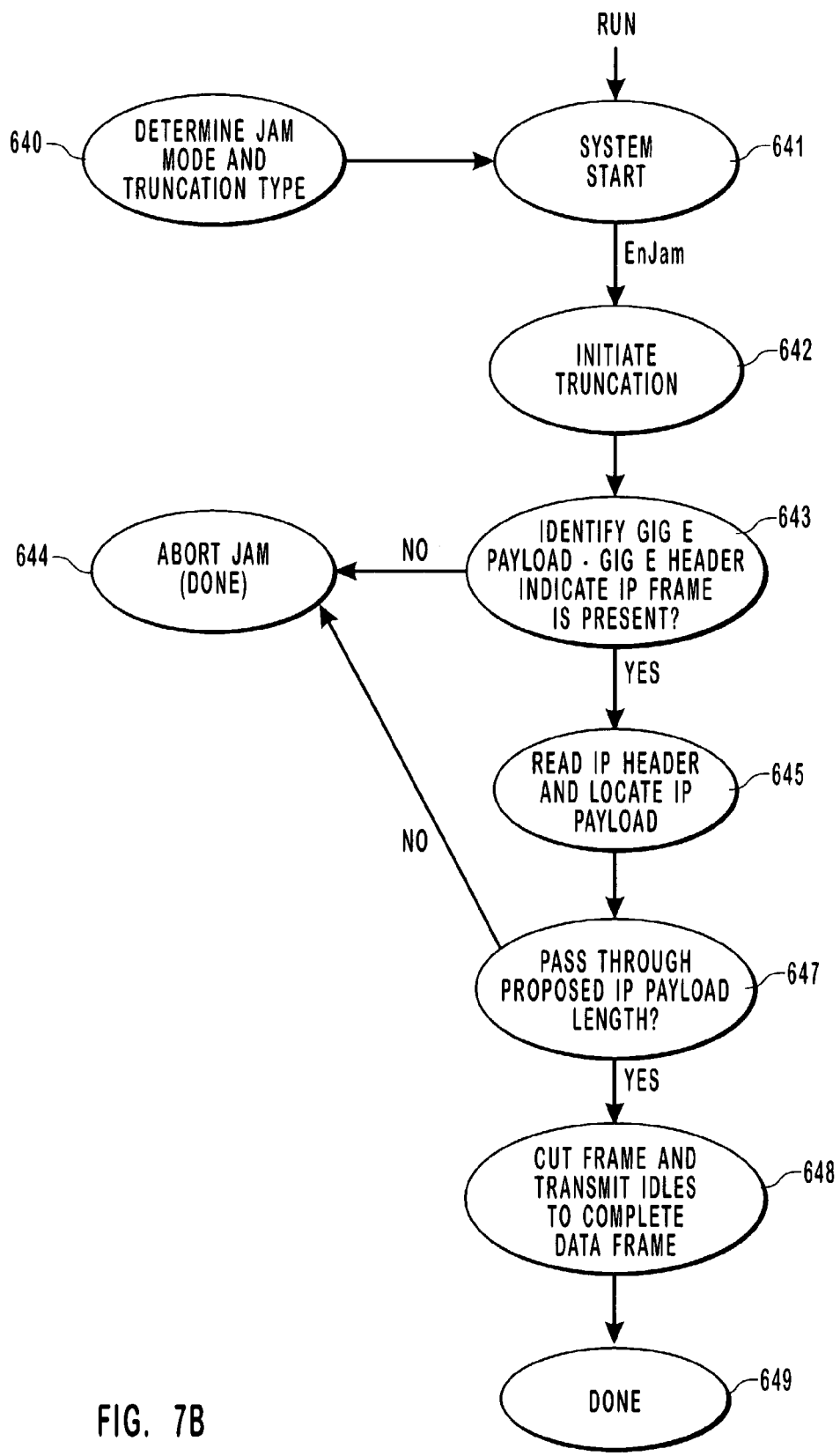
FIG. 7B is a state diagram illustrating various aspects of an exemplary truncation jam operation where the truncation occurs in the IP payload of the GigE data frame.

With reference now to FIG. 7B, and with reference as well to FIG. 4, details are provided concerning a process where the IP payload of an IP over GigE data frame is truncated. It should be noted at this juncture that a truncation scheme directed to the IP or TCP level of a GigE data frame, such as is implemented by exemplary embodiments of the invention, is somewhat more complex than truncation of, for example, a Fibre Channel data frame, at least in part because Fibre Channel truncation is built around the fact that the main Fibre Channel header always comprises six words. Thus, in a typical Fibre Channel truncation operation, the modification subsystem simply counts six words into the frame to get to the data payload, and then truncates the data payload as directed. In typical Fibre Channel truncation operations then, no determination as to the type or validity of the incoming data packet is required, or made.

Similar to the process described above in connection with FIG. 7A, the process begins at stage 640 where the host determines the jam mode and truncation type to be employed. When the Run signal is asserted, the process advances to stage 641 and the system is started. Upon assertion of the EnJam signal, the process moves to stage 642 where the desired truncation is initiated. The modification logic and state machine 608 then advances to stage 643.

At stage 643, the modification logic and state machine 608 identifies the GigE payload by counting through the GigE header which, as noted above, always comprises a standard number of bytes, until the GigE payload is encountered. While counting through the GigE header, the modification logic and state machine 608 also examines the GigE header to determine whether or not the IP frame indicator is present. If the IP frame indicator is not present within the GigE header, then the process times out, or aborts, at stage 644.

In the event that the IP frame indicator is found within the GigE header however, the process advances to stage 645 where the modification logic and state machine 608 reads the IP header and locates the IP payload. After the IP payload has been located, the modification logic and state machine 608 advances to stage 647 where it counts through the IP payload the number of bytes requested by the proposed truncation. If the modification logic and state machine 608 encounters the end of the original frame before counting through the proposed number of bytes, such a result indicates that the original frame was shorter than the proposed truncation length. In this case, the process will abort at stage 644.

On the other hand, if the modification logic and state machine 608 passes through the proposed payload length without encountering the end of the original frame, then the proposed truncation is valid and can be performed. The process then advances to stage 648 where the frame is cut and terminated as required by the proposed truncation and the modification logic and state machine 608 then further transmits idles, or "I2" Ordered Sets, corresponding to the portion of the IP payload that was truncated, wherein the number of idles, or "I2" Ordered Sets, transmitted corresponds to the length of that portion of the payload that has been removed. If no repeat jam is to be performed, the process then terminates at stage 649.

Figure 7C:
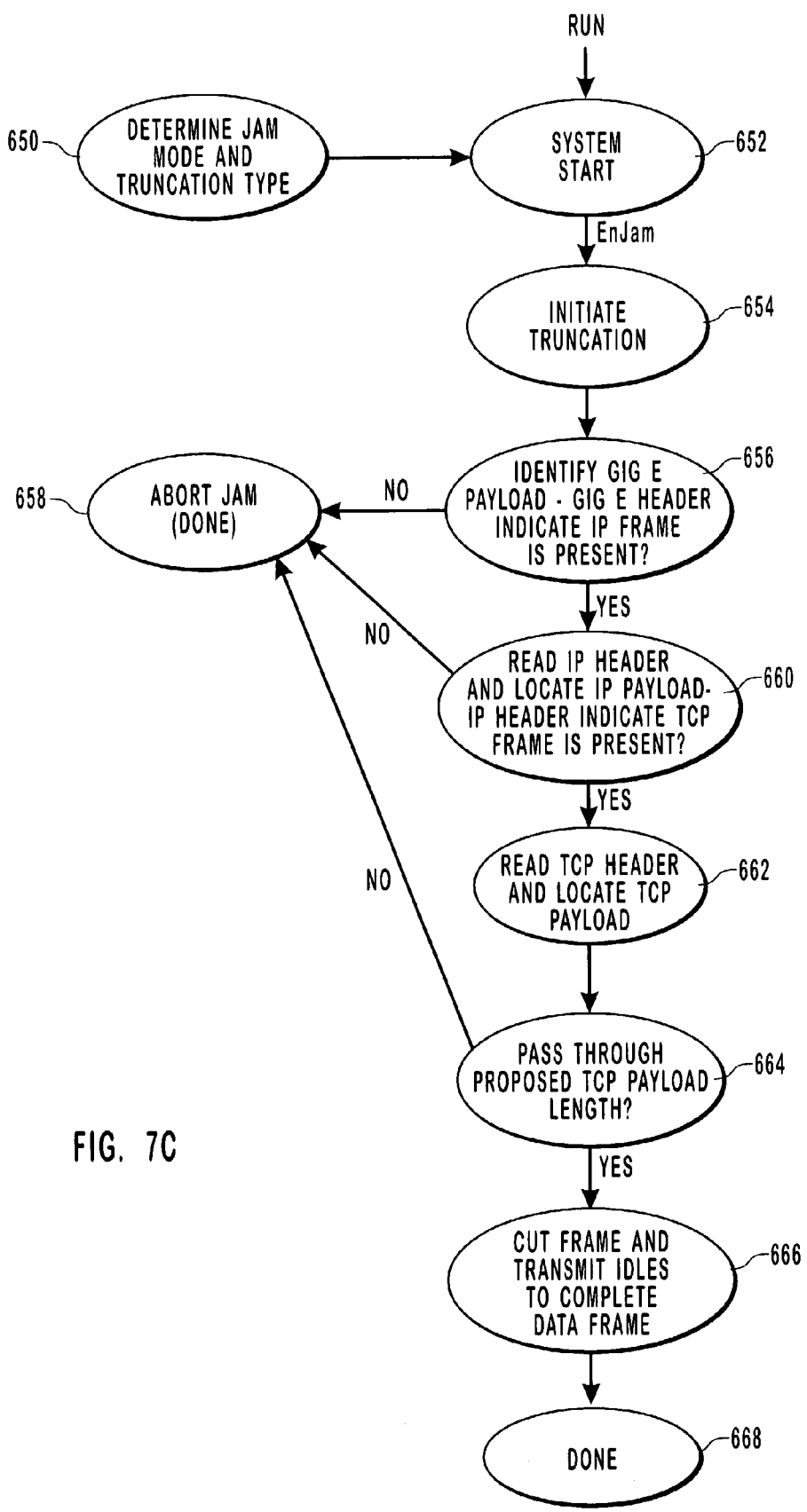
FIG. 7C is a state diagram illustrating various aspects of an exemplary truncation jam operation where the truncation occurs in the TCP payload of the GigE data frame.

Directing attention now to FIG. 7C, and with reference as well to FIG. 4, details are provided concerning a process where the TCP payload of a TCP/IP over GigE data frame is truncated. As stages 650 through 656 of the exemplary process illustrated in FIG. 7C are similar to stages 640 through 643 of the exemplary process illustrated in FIG. 7B, the following discussion will commence at stage 660.

At stage 660 of the process, the modification logic and state machine 608 reads the IP header and identifies the location of the IP payload. While processing the IP header, the modification logic and state machine 608 also then examines the IP header to determine whether or not the TCP frame indicator is present. If no TCP indicator is present, the process aborts at stage 658. In the event that a TCP frame is present, the process advances to stage 662 where the modification logic and state machine 608 reads the TCP header and locates the TCP payload.

The process then moves to stage 664 where the modification logic and state machine 608 counts through the TCP payload bytes the number of bytes requested by the proposed truncation. If the modification logic and state machine 608 encounters the end of the original frame before counting through the proposed number of bytes, this result indicates that the original frame was smaller than the proposed truncation, and the process aborts at stage 658. However, if the modification logic and state machine 608 passes through the requested number of bytes, the modification logic and state machine 608 then advances to stage 666 where the frame is cut and terminated as required by the proposed truncation and the modification logic and state machine 608 then further transmits idles, or "I2" Ordered Sets, corresponding to the portion of the TCP payload that was truncated, wherein the number of idles, or "I2" Ordered Sets, transmitted corresponds to the length of that portion of the payload that has been removed. If no repeat jam is to be performed, the process then terminates at stage 668.

As suggested by the foregoing discussion of the exemplary truncation operations illustrated in FIGS. 7A through 7C, the ability of the modification logic and state machine 608 to locate the various data payloads within the GigE, IP, or TCP data frames is based upon the GigE, IP, and TCP protocols. In particular, because the GigE, IP, and TCP protocols define the forms of the data frame construction, the modification logic and state machine 608 can use such construction information to readily derive the location of a data payload, once the lengths of the corresponding headers have been determined. More generally, embodiments of the invention are able to use the relevant protocol(s) to ensure, if a proposed data modification process is performed, that the data would be valid after implementation of the proposed modification. As noted earlier herein, such modified data exemplarily comprises a modified data packet or data frame, but the modified data may take various alternative forms as well.

Moreover, embodiments of the invention not only provide for the truncation of various data packets within a data frame, but also permit the extent of the truncation of such data packets to be customized or selected in accordance with application, system, protocol, or other requirements. By way of example, some exemplary embodiments provide the ability to truncate the IP data payload of the data frame to zero bytes past a valid IP header. Yet other exemplary embodiments provide the ability to truncate the data frame to zero bytes past a valid TCP header. Of course, such arrangements are exemplary only and truncation past one or more of such headers, or other headers of the data frame, can be adjusted upward from zero bytes, as desired and/or required.

Yet other aspects of the truncation functionality of exemplary embodiments of the invention relate to data packets such as data frames that include relatively small components, or fields, that are not necessarily word-aligned and may thus be positioned anywhere within the data frame. In this regard, it was noted earlier herein that exemplary embodiments of the invention are effective in implementing, among other things, bytewise truncation of the payload of a data packet such as a data frame. More particularly, exemplary embodiments of the invention are not constrained to performing truncation operations only at 32 bit, or word, boundaries within the data frame, but rather provide for performing one or more truncation operations commencing, and terminating, at a particular byte within the data frame or other data packet, thereby facilitating implementation of relatively more precisely focused truncation operations on data frames that include components of relatively small size, such as 8 bits or smaller, that are characteristic of protocols such as the GigE protocol.

The ability of exemplary embodiments of the invention to perform such truncation operations on data frame payloads in increments smaller than 32 bits, for example, results in improvements to what is sometimes referred to as 'granularity,' that is, the precision with which truncation, or other, operations may be implemented within a particular data packet of a data stream. As discussed below, this functionality may be usefully employed in conjunction with the modification of data packets that are not word aligned, or otherwise aligned in some fashion, within the data stream.

In such unaligned data streams, one or more of the fields of the data frame may start at any byte within the 32 bit data stream and, accordingly, such fields are not necessarily aligned on a 32 bit word boundary. As noted earlier however, exemplary embodiments of the invention are configured to truncate the payload within the data frame, without regard to the positioning or alignment of the payload within the data frame. Thus, such embodiments are well suited for use in conjunction with unaligned data streams that include data packets having one or more fields aligned with reference to a particular byte, and not necessarily a word, within the data stream.

As discussed elsewhere herein, truncation of data payloads such as the IP and TCP data payloads may require updating of various error check fields within the data frame, so as to ensure the validity of the data frame, prior to transmission of the modified data frame back to the physical layer of the high speed communications system. Accordingly, attention is directed now to various operations that occur after a truncation, or other jam operation, has been implemented with respect to the data stream.

Figure 8:
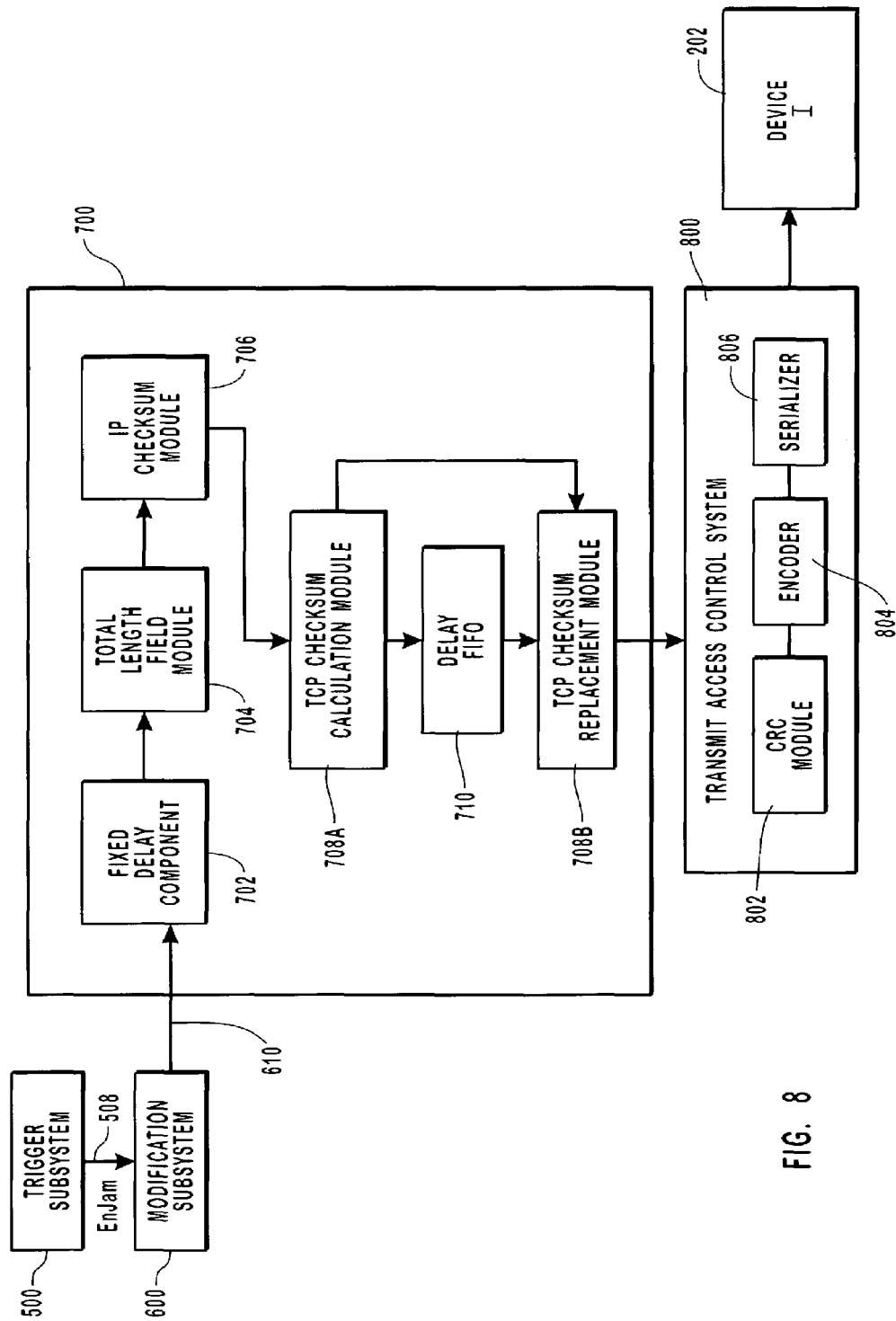
FIG. 8 is a block diagram that illustrates aspects of an exemplary embodiment of a validation subsystem.

In this regard, a validation subsystem 700, an exemplary implementation of which is illustrated in FIG. 8, is provided that serves to identify and update, as required, one or more error check fields of the modified data packet in order to ensure that, except with regard to the jam, the data packet is otherwise valid and can be processed by, and tracked through, the high speed communications system. As indicated in FIG. 8, the validation subsystem 700 is an 'in-line' component in that the data stream is always passed through the validation subsystem 700, as indicated at line 610, whether or not data in the data stream has been modified by one of the modification subsystems.

Generally, at such time as a jam has been implemented by the modification subsystem 600, whether the jam comprises the data payload truncation type jam discussed above, or another jam type such as bits/words jams, OS jams or vanish frame jams, the data stream carrying the modified data is then passed on to the validation subsystem 700, as is schematically indicated by line 610, and as discussed in further detail below. In the particular case of a frame jam, such as a bit/words jam or truncation jam, the validation subsystem 700 may further alter the modified data packet, as discussed in further detail below.

Directing more particular attention now to FIG. 8, further details are provided concerning the treatment of the jammed, or modified, data stream produced by the modification subsystem 600 in response to input provided by the trigger subsystem 500. The modified data frame is passed from the modification subsystem 600 to the validation subsystem 700 where, as dictated by controls from the modification subsystem, the data frame may or may not be altered in order to further ensure the validity of the frame. If, on the other hand, no trigger has occurred, then no EnJam signal is generated and, accordingly, no jam is implemented by the modification subsystem 600. In such a case, the data stream passes through the validation subsystem 700 unaltered.

In general, the validation subsystem 700 is suitable for use with both aligned, and unaligned, data streams and serves to ensure that, notwithstanding any user-imposed errors that may be present in a particular data frame or other data packet, the IP and TCP packets of the modified data frame, which exemplarily comprises a GigE data frame, nonetheless comport with the IP and TCP protocols, respectively, at least to the extent necessary that the data frame will not be rejected, or go unrecognized, by the receiving device or other component or device of the high speed communications system 200.

Thus, the validation subsystem 700 helps to ensure, among other things, the traceability of any data packets that include one or more user-imposed errors introduced by way of the modification subsystem 600. Consequently, the user is able to readily track the response of the high speed communications system 200 (FIG. 1) to particular, traceable, user-modified data packets, and can then use the information thus obtained to implement various remedial or other actions concerning the high speed communications system 200.

More specific reference is now made to various aspects of the illustrated embodiment of the validation subsystem 700. As noted earlier, the data stream transmitted by the modification subsystem 600 is sent to a fixed delay component 702 of validation subsystem 700. Note that this is true without regard to whether or not the data stream has been modified by the modification subsystem 600 as the result of the presence of a jam condition.

In at least some embodiments, the fixed delay component 702 is implemented through the use of shift registers. Alternatively, the fixed delay component 702 may comprise a FIFO data buffer. Any equivalent structure(s) may be substituted however. The validation subsystem 700 further includes a variety of validation modules that, in general, serve to update as necessary, one or more error check fields of a designated data packet. Various other functionalities may likewise be implemented within one or more of such validation modules. In the illustrated exemplary embodiment of the validation subsystem 700, the validation modules include a total length field (TLF) module 704, an IP checksum module 706, and TCP checksum calculation and replacement modules, 708A and 708B respectively. In addition to these exemplary validation modules, the exemplary embodiment of the validation subsystem includes a delay FIFO 710 as well.

In general, the validation subsystem 700 may be configured to include a variety of additional, or alternative, validation modules directed to validation of various other fields or aspects of the data packet as necessary to suit the requirements of a particular application, system, or protocol. Further, the relative positioning of such validation modules with respect to each other and with respect to other components in the validation subsystem 700 may likewise be varied as necessary. Accordingly, the embodiment of the validation subsystem 700 illustrated in FIG. 8 is exemplary only and should not be construed to limit the scope of the invention in any way.

With continuing reference to FIG. 8, the validation subsystem 700 is configured and arranged for communication with a transmit access control system 800 that is arranged to receive the data stream after it has been processed by the various validation modules. The transmit access control system 800 exemplarily comprises a CRC module 802, an encoder 804, and a serializer 806. As described in further detail below, an exemplary embodiment of the transmit access control system 800 serves to provide standard media access control (MAC) level functions for placing the data stream onto the physical GigE, or other, medium.

It should be noted that the illustrated embodiment of the transmit access control system 800 is exemplary only. Transmit access control systems of various other configurations and functionality may likewise be employed, consistent with the requirements of a particular application, system, or protocol.

In connection with the operational aspects of the validation subsystem 700, it was noted earlier that so long as EnJam 508 remains inactive, the data stream simply passes through the validation subsystem 700 unaltered, and no changes will be made to the data stream by the validation subsystem 700. In some alternative embodiments however, the validation subsystem 700 nonetheless performs various checks or validations on aspects of certain user-identified data frames, even if such data frames have not been altered by the modification subsystem 600. In the event that EnJam 508 goes active however, so as to cause the introduction of user-specified errors into one or more data packets of the data stream, the validation subsystem 700, guided by the requirements of the relevant protocol, will then implement appropriate corresponding action(s).

With continued attention now to FIG. 8, further details are provided concerning various operational aspects of the validation subsystem 700, beginning with the fixed delay component 702. Generally, the fixed delay component 702 serves to impose a time delay of predetermined length on the transmission of the data stream. This predetermined time delay is generally calculated to permit the modification subsystem 600 sufficient time to check relatively deeper into the frame in order to determine that the frame is valid for IP or TCP, as applicable, and also allows the modification subsystem 600 to determine whether or not the total length field of the frame is required to be updated, and to calculate this new value if necessary. With particular reference to the total length field determination, the beginning of the frame must be delayed by the fixed delay component 702 before the frame arrives at the TLF module 704 so that the modification subsystem 600 has time to perform the appropriate operation and to directly pass commands to the TLF module 704 that will arrive at the TLF module 704 prior to the time that the frame emerges from the fixed delay component 702 and passes to the TLF module 704.

Not only is the time delay relatively short, but the time delay typically has little or no perceptible effect on the performance or reliability of the high speed communications system 200. In particular, the time delay imposed by the fixed delay component 702 is front-loaded on the data stream upon initial transmission so that the entire data stream is delayed for the predetermined time delay period. At such time as the time delay expires and data flow ultimately commences to a receiving device, such as device I 202 (FIG. 1) for example, the fixed delay component 702 does not impose any subsequent interruptions in the data flow to that receiving device. Thus, while a relative time delay occurs, the transmitting and receiving devices are effectively synchronized with each other so that the receiving device does not perceive the time delay imposed by the fixed delay component 702.

V. Recalculation of Error Checking Fields

As suggested earlier, at least one purpose of the time delay imposed by the fixed delay component 702 is to permit the validation subsystem 700 to perform various operations concerning aspects of one or more user-modified data packets, such as data frames, of the data stream. By way of example, a data frame typically includes various error checking, and other, fields that must be updated so as to take into account changes imposed on the frame by the modification subsystem 600, and to ensure the validity of the modified data frame. Also, to the extent that there are additional embedded protocols contained within the data payload of the data frame, there are similar types of error checking and/or frame size fields that must be appropriately updated. For example, in some exemplary embodiments, the system supports IP and TCP as embedded protocols for GigE, each of which contain fields that require updating as a result of errors introduced into the data stream by a user. Of course, other embedded protocols would be supported in a similar manner.

Thus, in an exemplary embodiment, the data stream is supplied to the TLF module 704. In this embodiment, the TLF module 704 uses instructions and a newly calculated TLF value provided by the modification subsystem 600, to locate the Total Length field in the IP header portion of the data frame and insert the new TLF value in the data frame specified by the modification subsystem 600.

One example of a modification to the data frame that would necessitate an update of the IP Total Length field is a truncation of the TCP data payload. More specifically, such a truncation would serve not only to reduce the length of the TCP data payload but, more generally, the overall or total length of the IP frame. Thus, the Total Length field would need to be correspondingly updated in order to ensure the validity of the data frame so that the data frame could be recognized and processed by a receiving device. As noted earlier, valid frames are necessary to facilitate tracking of the response of the high speed communications system to the modified data frame.

Once the Total Length field, for example, has been updated, the modified data frame is then passed to the IP checksum module 706. Similar to the case of the first validation module, the operations performed by the IP checksum module 706 relate, in this exemplary embodiment, to an error checking field of the data frame whose value is rendered out-of-date or inaccurate when certain aspects of the contents of the data frame have been altered or modified, such as by truncation or other processes implemented by the modification subsystem 600. More specifically, the IP checksum module 706 serves to update an error checking field, such as an IP checksum contained within an embedded IP packet of the data frame. Typically, the IP checksum module 706 updates the IP checksum by locating the IP checksum field in the IP header portion of the data frame, calculating the new IP checksum value and then replacing the old IP checksum value with the newly calculated value.

Depending upon variables such as the type and structure of a given modified data packet, as well as the particular protocol in conjunction with which the data packet is employed, the data packet may include additional error checking, or other, fields that must be updated as a result of changes, such as frame cut or other jams, imposed by a user with regard to various aspects of the data packet. This is the case for data frames that contain, for example, an embedded TCP protocol. In particular, a TCP packet includes, among other things, a field containing a checksum value. However, as required by the TCP definitions, this field is located at the front of the TCP packet, as opposed to the end, as is the case with the Fibre Channel CRC and many other protocols. As such, a new TCP checksum value cannot be calculated until the calculator has processed the entire data frame. Similar to the replacement of the TLF mentioned earlier, this requires that the entire data frame be delayed while the TCP checksum is calculated, so that the new checksum value may be replaced at the beginning of the frame after it emerges from the delay component.

In the illustrated embodiment, the delay of the data stream is implemented by way of a delay FIFO 710. In particular, the data stream is stored in the delay FIFO 710 after passing through the TCP checksum calculation module 708A. In some exemplary embodiments, the size of the delay FIFO 710 is adjustable so that it can be made sufficiently large to delay a data frame having a size that corresponds to the largest frame that will be encountered in the high speed communications system 200 (FIG. 1).

The designated data frame passes through the TCP checksum calculation module 708A, and as it does so, the TCP checksum calculation module 708A calculates the TCP checksum. Meanwhile, the frame comes out of the TCP checksum calculation module 708A and is delayed inside the delay FIFO. Once the TCP checksum calculation module 708A reaches the end of the frame and has calculated the TCP checksum, the TCP checksum calculation module 708A forwards this information on to the TCP checksum replacement module 708B so that the TCP checksum replacement module 708B has this information by the time the delayed frame reaches the TCP checksum replacement module 708B. The TCP checksum replacement module 708B then replaces the old TCP checksum value with the newly calculated value.

As in the case of the other error check fields of the data frame, the user can optionally dictate that the TCP checksum is not modified and the data frame is simply passed through the TCP checksum calculation module 708A and the TCP checksum replacement module 708B, and encoded as discussed below. More generally however, the user has the option to replace a variety of fields on any triggered frame, whether or not any other modifications to the frame are implemented by the modification subsystem. Thus, the user has the option, for example, to replace the IP Checksum and/or CRC on a triggered frame, even if no other modifications have been made to that frame.

As suggested by the foregoing, the TCP checksum calculation and replacement modules 708A and 708B, respectively, are well-suited for use in the processing of data packets, such as TCP data frames for example, that include fields that are disposed at various locations throughout the data packet, rather than being situated at the end of the data packet. This is due at least in part to the ability of the delay FIFO 710 to hold an entire data frame, and thereby permit ready recalculation and replacement of field values, such as the TCP checksum, that are based upon information derived from, or based upon, the data frame as a whole. Of course, either, or both, of the TCP checksum calculation module 708A and the TCP checksum replacement module 708B may be configured to perform various additional or alternative operations as well with respect to the contents of the data frame. Accordingly, the scope of the invention is not limited solely to the illustrated embodiment of the validation subsystem 700.

In any event, the data stream leaves the validation subsystem 700 and is then supplied to the transmit access control system 800. In this exemplary embodiment, the transmit access control system 800 provides standard MAC-level functions for placing the data stream on to the physical GigE, or other, medium.

More specifically, the CRC value of the triggered data packet is calculated and placed in the appropriate data frame location by the CRC module 802. Then, the data stream is encoded, by encoder 804, for transfer onto the physical network medium. In one embodiment of the invention, such encoding is performed by converting 32 bit portions of the data stream to a 40 bit format for serial data transfer. Various other types of encoding may alternatively be performed however, depending upon variables such as the applicable protocol of the relevant high speed communications system.

After the encoding process has been completed, the encoded data frame is serialized by the serializer module 806, and then is placed on the physical transmission medium for transmission to, for example, device I 202 (FIG. 1). The modified data frame can now be tracked throughout the high speed communications system 200, and the response of the high speed communications system 200 to the modified data frame can be observed, captured, and evaluated for use in the development of remedial, and other actions and operations, concerning the high speed communications system 200.

VI. Computing Environments

Embodiments of the present invention may comprise a special purpose or general purpose computer including various computer hardware, as discussed in greater detail below. Embodiments within the scope of the present invention also include computer-readable media for carrying or having computer-executable instructions or electronic content structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or electronic content structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, or special purpose processing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of the program code means for executing steps of the methods disclosed herein. The particular sequence of such executable instructions or associated content structures represent examples of corresponding acts for implementing the functions described in such steps.

Of course, the invention may be practiced in network computing environments with many types of computer system configurations, including personal computers, handheld devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment for example, program modules may be located in both local and remote memory storage devices.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A modification subsystem for use in connection with a data stream carrying a plurality of data units, the modification subsystem comprising:
   (a) a command stack memory;
   (b) at least one jamming mode register that stores a jam setting corresponding to a bytewise truncation of a designated data unit carried in the data stream; and
   (c) a modification logic and state machine in communication with the command stack memory and the at least one jamming mode register, the modification logic and state machine being configured to receive the data stream.

2. The modification subsystem as recited in claim 1, wherein the command stack memory and the at least one jamming mode register are configured to receive input from a host device.

3. The modification subsystem as recited in claim 1, wherein the jamming mode register contains a global jam command.

4. The modification subsystem as recited in claim 1, wherein the bytewise truncation comprises a bytewise truncation of a payload of the designated data unit.

5. The modification subsystem as recited in claim 1, wherein the bytewise truncation comprises one of: a Gigabit Ethernet frame truncation; truncation of an IP frame embedded in a Gigabit Ethernet frame; and, truncation of a TCP frame embedded in an IP frame that is embedded in a Gigabit Ethernet frame.

6. The modification subsystem as recited in claim 1, wherein the modification logic and state machine is configured to receive a jam signal.

7. The modification subsystem as recited in claim 1, wherein the modification logic and state machine is configured to receive trigger condition information.

8. The modification subsystem as recited in claim 1, wherein the modification logic and state machine is configured to receive information concerning the location and alignment of the designated data unit.

9. A modification subsystem for use with a high speed communications system that substantially conforms with the Gigabit Ethernet physical specification, the high speed communications system being configured to operate in conjunction with a data stream carrying Gigabit Ethernet data frames, and the modification subsystem comprising:
   (a) a command stack memory;
   (b) at least one jamming mode register that stores a jam setting corresponding to a truncation of a designated Gigabit Ethernet data frame; and
   (c) a modification logic and state machine in communication with the command stack memory and the at least one jamming mode register.

10. The modification subsystem as recited in claim 9, wherein the jamming mode register contains at least one jam mode value.

11. The modification subsystem as recited in claim 9, wherein the command stack memory and the at least one jamming mode register are configured to receive input from a host device.

12. The modification subsystem as recited in claim 9, wherein the modification logic and state machine is configured to receive a jam signal.

13. The modification subsystem as recited in claim 9, wherein the modification logic and state machine is configured to receive trigger condition information.

14. The modification subsystem as recited in claim 9, wherein the modification logic and state machine is configured to receive information concerning the location and alignment of the designated Gigabit Ethernet data frame.

15. The modification subsystem as recited in claim 9, wherein the truncation of the designated Gigabit Ethernet data frame comprises one of: a Gigabit Ethernet payload truncation; an IP payload truncation; and, a TCP payload truncation.

16. The modification subsystem as recited in claim 9, wherein the truncation of the designated Gigabit Ethernet data frame comprises a byte level truncation of the designated Gigabit Ethernet data frame.

17. A method for altering a designated data unit carried in a data stream, the method comprising:
   (a) receiving the data stream;
   (b) receiving a jam signal;
   (c) accessing, in response to receipt of the jam signal, a jam setting that corresponds to a bytewise truncation of the designated data unit;
   (d) determining whether the bytewise truncation is valid;

(e) performing the bytewise truncation on the designated data unit, if a determination has been made that the bytewise truncation is valid; and (f) aborting the bytewise truncation of the designated data unit, if a determination has been made that the bytewise truncation is invalid.

18. The method as recited in claim 17, wherein performing the bytewise truncation of the designated data unit comprises performing a bytewise truncation of one of: a Gigabit Ethernet frame; an IP frame embedded in a Gigabit Ethernet frame; and, a TCP frame embedded in an IP frame that is embedded in a Gigabit Ethernet frame.

19. The method as recited in claim 18, wherein the bytewise truncation comprises truncation of an IP frame embedded in a Gigabit Ethernet frame, and the method further comprises:

(a) determining whether an IP frame indicator is present in the Gigabit Ethernet frame; and (b) aborting the bytewise truncation of the IP frame if no IP frame indicator is present in the Gigabit Ethernet frame.

20. The method as recited in claim 18, wherein the bytewise truncation comprises truncation of a TCP frame embedded in an IP frame that is embedded in a Gigabit Ethernet frame, and the method further comprises:

(a) determining whether an IP frame indicator is present in the Gigabit Ethernet frame;

(b) aborting the bytewise truncation of the TCP frame if no IP frame indicator is present in the Gigabit Ethernet frame;

(c) determining, if an IP frame indicator is present in the Gigabit Ethernet data frame, whether a TCP frame indicator is present in the IP frame; and (d) aborting the bytewise truncation of the TCP frame if no TCP frame indicator is present in the IP frame.

21. The method as recited in claim 17, wherein determining whether the bytewise truncation is valid comprises:

(a) counting through the designated data unit, up to a point that delimits a length of the bytewise truncation;

(b) determining that the bytewise truncation is invalid, if an end of the designated data unit is encountered prior to the point delimiting the bytewise truncation length; and (c) determining that the bytewise truncation is valid, if the end of the designated data unit is not encountered prior to the point delimiting the bytewise truncation length.

22. The method as recited in claim 17, wherein at least the accessing, determining, and truncating processes are performed in response to receipt of the jam signal.

23. The method as recited in claim 17, further comprising receiving triggering information concerning the designated data unit.

24. The method as recited in claim 17, further comprising receiving location and alignment information concerning the designated data unit.

25. The method as recited in claim 17, further comprising transmitting the designated data unit, regardless of whether the designated data unit has been modified.

26. The method as recited in claim 17, further comprising transmitting the data stream, regardless of whether the designated data unit has been modified.

27. A method for altering a designated Gigabit Ethernet data frame carried in a data stream, the method comprising:

(a) receiving the data stream;

(b) receiving a jam signal;

(c) accessing, in response to receipt of the jam signal, a jam setting that corresponds to a truncation of the designated Gigabit Ethernet data frame;

(d) determining whether the truncation is valid;

(e) truncating the designated Gigabit Ethernet data frame if a determination has been made that the truncation is valid; and (f) aborting truncation of the designated Gigabit Ethernet data frame, if a determination has been made that the truncation is not valid.

28. The method as recited in claim 27, wherein truncating the designated Gigabit Ethernet data frame comprises performing a bytewise truncation of the designated Gigabit Ethernet data frame.

29. The method as recited in claim 27, wherein the payload truncation comprises a truncation of one of: a Gigabit Ethernet payload; an IP payload; and, a TCP payload.

30. The method as recited in claim 27, wherein the truncation of the designated Gigabit Ethernet data frame is performed at an 8 bit boundary within the data stream.

31. The method as recited in claim 27, wherein determining whether the truncation is valid comprises:

(a) counting through the designated Gigabit Ethernet data frame, up to a point that delimits a length of the bytewise truncation;

(b) determining that the bytewise truncation is invalid, if the end of the designated Gigabit Ethernet data frame is encountered prior to the point delimiting the bytewise truncation length; and (c) determining that the bytewise truncation is valid, if the end of the designated Gigabit Ethernet data frame is not encountered prior to the point delimiting the bytewise truncation length.

32. The method as recited in claim 27, wherein at least the accessing, determining and truncating processes are performed substantially in real time.

33. The method as recited in claim 27, wherein, if the truncation is performed, a corresponding number of idles are inserted into the modified designated Gigabit Ethernet data frame.

34. The method as recited in claim 27, further comprising transmitting the designated Gigabit Ethernet data frame, regardless of whether the designated Gigabit Ethernet data frame has been truncated.

35. The method as recited in claim 27, further comprising repeating at least (a) through (e).

36. A computer program product for implementing a method for altering a designated portion of a data stream, the computer program product comprising:

a computer readable medium carrying computer executable instructions for performing the method, wherein the method comprises:

(a) receiving the data stream;

(b) receiving a jam signal;

(c) accessing, in response to receipt of the jam signal, a jam setting that corresponds to a bytewise truncation of the designated data unit;

(d) determining whether the bytewise truncation is valid;

(e) performing the bytewise truncation on the designated data unit, if a determination has been made that the bytewise truncation is valid; and (f) aborting the bytewise truncation of the designated data unit, if a determination has been made that the bytewise truncation is invalid.

* * * * *

UNITED STATES PATENT AND TRADEMARK OFFICE
CERTIFICATE OF CORRECTION

| | |
|---|---|
| PATENT NO. | : 7,007,208 B1 |
| APPLICATION NO. | : 10/448917 |
| DATED | : February 28, 2006 |
| INVENTOR(S) | : Hibbert et al. |

It is certified that error appears in the above-identified patent and that said Letters Patent is hereby corrected as shown below:

Column 16
Line 10, change "OS or field" to --OS, field--
Line 11, after "start", remove [,]
Line 25, after "discussion", remove [then]

Column 17
Line 3, change "$predetermined" to --predetermined--

Column 20
Line 61, change "I)2" to --I2--

Signed and Sealed this

Thirtieth Day of November, 2010

David J. Kappos
*Director of the United States Patent and Trademark Office*